(12) United States Patent
Schulz

(10) Patent No.: US 10,846,627 B2
(45) Date of Patent: Nov. 24, 2020

(54) METHOD, APPARATUS, AND PROGRAM PRODUCT FOR GENERATING PRODUCT REPAIR COST ESTIMATES

(71) Applicant: Etsia Digital, Inc., Leander, TX (US)

(72) Inventor: Craig Schulz, Simi Valley, CA (US)

( * ) Notice: Subject to any disclaimer, the term of this patent is extended or adjusted under 35 U.S.C. 154(b) by 955 days.

(21) Appl. No.: 13/622,994

(22) Filed: Sep. 19, 2012

(65) Prior Publication Data

US 2014/0081876 A1  Mar. 20, 2014

(51) Int. Cl.
   *G06Q 10/06* (2012.01)
   *G06Q 40/08* (2012.01)
   *G06Q 10/00* (2012.01)

(52) U.S. Cl.
   CPC ............ *G06Q 10/06* (2013.01); *G06Q 10/20* (2013.01); *G06Q 40/08* (2013.01)

(58) Field of Classification Search
   CPC ..................................................... G06Q 40/08
   See application file for complete search history.

(56) References Cited

U.S. PATENT DOCUMENTS

| | | |
|---|---|---|
| 4,435,769 A | 3/1984 | Nagano et al. |
| 5,128,859 A | 7/1992 | Carbone et al. |
| 5,432,904 A | 7/1995 | Wong |
| 5,504,674 A | 4/1996 | Chen et al. |
| 5,950,169 A | 9/1999 | Borghesi et al. |
| 6,185,540 B1 | 2/2001 | Schreitmueller et al. |
| 7,107,239 B2 | 9/2006 | Graff |
| 7,953,615 B2 | 5/2011 | Aquila et al. |
| 8,095,391 B2 | 1/2012 | Obora et al. |
| 8,200,513 B2 | 6/2012 | Vahidi et al. |
| 8,200,707 B2 | 6/2012 | Littooy et al. |
| 2002/0059087 A1 | 5/2002 | Wahlbin et al. |
| 2002/0062233 A1 | 5/2002 | Wahlbin et al. |
| 2004/0102984 A1 | 5/2004 | Wahlbin et al. |

(Continued)

FOREIGN PATENT DOCUMENTS

WO   2012113084 A1   8/2012

OTHER PUBLICATIONS

Edmunds.com Homepage, http://web.archive.org/web/20090326083630/http://www.edmunds.com/, Wayback Machine Mar. 26, 2009.*

(Continued)

*Primary Examiner* — Aryan E Weisenfeld
(74) *Attorney, Agent, or Firm* — Russell D. Culbertson; The Culbertson Group, P.C.

(57) ABSTRACT

A method encompasses a damage evaluation session which may be initiated by an evaluation system user using a user device such as a smartphone. The evaluation session allows the user to identify a damaged section of a damaged product, and then displays a properly sized representation of the damaged section at the user device. This displayed representation of the damaged section is associated with a grid which defines a number of grid segments with each grid segment located over a respective portion of the representation. The method includes receiving a damage severity level input for one or more of the grid segments. Based upon the damage severity level input for the one or more grid segments, damage estimate data is retrieved from a repair data store and applied to produce an overall repair cost estimate for the damaged section.

3 Claims, 17 Drawing Sheets

(56) References Cited

U.S. PATENT DOCUMENTS

| | | |
|---|---|---|
| 2005/0108065 A1 | 5/2005 | Dorfstatter |
| 2007/0203866 A1* | 8/2007 | Kidd et al. .................... 706/47 |
| 2008/0172258 A1 | 7/2008 | Weger et al. |
| 2008/0255887 A1 | 10/2008 | Gruter |
| 2009/0138290 A1* | 5/2009 | Holden ............................ 705/4 |
| 2010/0138242 A1 | 6/2010 | Ferrick et al. |
| 2011/0246244 A1 | 10/2011 | O'Rourke |
| 2012/0109660 A1* | 5/2012 | Xu et al. ....................... 705/1.1 |

OTHER PUBLICATIONS

PCT, International Search Report dated Jan. 22, 2014 in corresponding PCT Application No. PCT/US13/60704 (3 pages).
PCT, Written Opinion of the International Searching Authority dated Jan. 22, 2014 in corresponding PCT Application No. PCT/US13/60704 (6 pages).

* cited by examiner

METHOD, APPARATUS, AND PROGRAM PRODUCT FOR GENERATING PRODUCT REPAIR COST ESTIMATES

TECHNICAL FIELD OF THE INVENTION

The present invention relates to a system for automated evaluation of damages to a vehicle or other product and for automated production of repair cost estimates. The invention encompasses methods for evaluating damages and producing repair cost estimates as well as apparatus and program products for implementing the methods.

BACKGROUND OF THE INVENTION

Damage estimation is commonly required for vehicles that have been involved in some sort of accident or have otherwise suffered damage. Damage estimates have historically been prepared by experienced and skilled personnel such as insurance adjusters, writers, estimators, or appraisers. The person preparing the estimation reviews the damage, commonly in person, and prepares an estimate of the anticipated costs for repair or replacement based on their own judgment and experience, or with the aid of a computer program which stores repair cost information. Once the estimate is produced, the consumer may take the vehicle to a repair shop where the estimate is used as a basis for an approved payment to the repair shop in exchange for the repair of the vehicle.

One problem with prior damage evaluation processes is that they can be inconvenient to the consumer. The consumer must schedule a time and place for an estimator to see the damaged vehicle to facilitate the damage evaluation. Perhaps most importantly, however, prior damage evaluation processes may only be accurately performed by skilled personnel. Thus prior damage evaluation processes represent a significant cost to the insurance company, property owner, or property guardian responsible for producing the damage repair estimation. There is therefore a need for streamlining and improving the product damage evaluation process to reduce the required time and costs.

SUMMARY OF THE INVENTION

The various embodiments of the present invention provide processes and systems for performing damage evaluations and generating repair cost estimates without the need for a skilled professional estimator. In particular, vehicle owners, vehicle users, vehicle guardians, and others may utilize a smart phone, personal computer, or other network-connected computing device to interface with a remote damage evaluation system which can quickly produce an accurate estimation for repair of the vehicle.

It should be noted that although the invention has particular application to vehicles such as cars, trucks, boats, and motorcycles, evaluation processes within the scope of the present invention are by no means limited to use with vehicles. Rather, the present invention applies to any type of product for which a damage evaluation and repair estimate may be needed.

In one embodiment, a method according to the present invention encompasses an evaluation session which may be initiated by an evaluation system user using a user device which may be a smart phone, personal computer, tablet computer, or other Internet enabled device. This evaluation session includes receiving product identifying information which identifies a product which has been damaged. This product identifying information allows a sectional representation of the product to be displayed to the user via the user device and the sectional representation allows the user to provide a section input which identifies a damaged section of the damaged product. Where the damaged product is a car, the section input might identify the hood or passenger side front quarter panel as the damaged section, for example. Once a damaged section of the product has been identified, various embodiments of the present invention further include causing a properly sized representation of the damaged section to be displayed at the user device. Some forms of the invention may include prompting the user to enter certain inputs to provide a representation (such as a photograph) of the damaged section and to resize the representation as necessary. This displayed representation of the damaged section is associated with a grid which defines a number of grid segments with each grid segment located over a respective portion of the representation. Once the grid-associated representation is displayed at the user device, the method allows the user to make a damage severity level input for one or more of the grid segments. Based upon the damage severity level input(s), damage estimate data are retrieved from a repair data store and the damage data are applied to produce an overall repair cost estimate for the damaged section. The damage severity level input and the particular grid segment associated with the damage severity level input represent user-supplied damage information which may be used to produce the overall repair cost estimate.

Of course, the present invention is not limited to evaluating and providing a damage repair estimate for simply a single section of the given product. Rather, two or more damaged sections may be identified, a grid-associated representation of each damaged section may be displayed, and damage severity level inputs may be received for one or more grid segments of each of the damaged sections of the product. Ultimately, a method within the scope of the present invention may, based on the damage severity level inputs received for the various grid segments of the different damaged sections, produce an overall repair cost estimate for all of the indicated damaged sections of the product.

Each of the various steps in the illustrative methods described in the preceding paragraph may include variations and additional substeps. For example, the step of receiving product identifying information to identify the damaged product may include receiving an account identifier, such as an insurance account identifier, from the user device, and performing a lookup in a suitable database to read product identifying information associated with the account identifier. Numerous other options regarding the receipt of product identifying information and the other steps in the illustrative method described above will be described below in connection with the illustrative processes shown in the drawings.

The invention further includes apparatus for facilitating the above-described methods and other embodiments. One particular apparatus embodying the principles of the invention includes a data storage device and a data processing device which are operably connected for communication with each other. The data processing device is configured to perform the steps indicated above. Namely, the data processing device is configured to receive the product identifying information, the section input(s), and the damage severity level input(s). The data processing device is also configured to cause the grid-associated section representations to be displayed at a display of the user device, and to retrieve the damage estimate data from the repair data store and produce the overall repair cost estimate for the damaged section. The repair data store may be stored in the data storage device or in one or more additional data storage devices, or in a combination of the data storage device and one or more additional data storage devices.

It will be appreciated that the data processing device may comprise a general purpose data processing device. Thus the invention also encompasses program products stored on one or more tangible data storage devices. Program products embodying the principles of the invention may include grid correlation program code, input program code, and evaluation program code. The grid correlation program code is executable to cause the grid-associated damaged section representation to be displayed on the user device. The input program code is executable to receive the product identifying information, the section input(s), and the damage severity level input(s). The evaluation program code is executable to retrieve the damage estimate data based on the various damage severity level inputs and produce the overall repair cost estimate for the damaged section or sections.

As noted above regarding the methods of evaluating the damaged product and generating a repair cost estimate, there are numerous variations within the scope of the present invention. So too are there many variations in the apparatus and program products within the scope of the present invention. Apparatus and program product variations will be discussed in the following description of illustrative embodiments along with variations in the inventive method.

These and other advantages and features of the invention will be apparent from the following description of the preferred embodiments, considered along with the accompanying drawings.

DESCRIPTION OF ILLUSTRATIVE EMBODIMENTS

Figure 1:
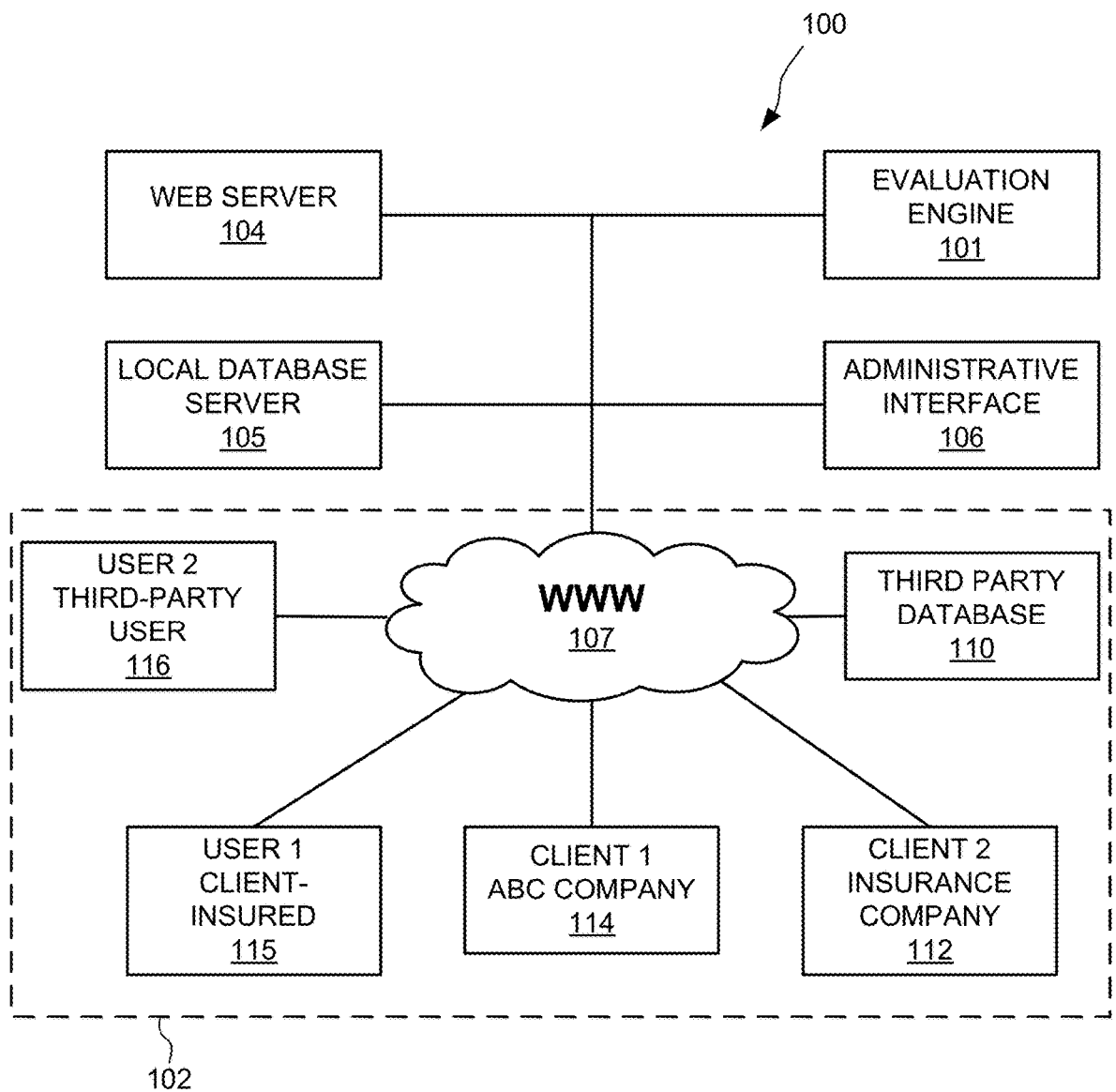
FIG. 1 is a schematic diagram showing a high level system configuration according to one embodiment of the present invention, and also showing a system connection to the Internet and example remote devices that may interface with the system.

FIG. 1 illustrates a damage evaluation system 100 within the scope of the present invention. Evaluation system 100 includes elements that collect or store information necessary or useful for performing evaluations and also includes an evaluation engine 101 that performs the evaluations and produces damage repair estimates. FIG. 1 also shows elements in dashed box 102 which are not included in evaluation system 100 but which provide or facilitate data inputs for a given evaluation or provide configuration inputs for configuring various options or rules to be applied in a given evaluation.

Referring to the evaluation system 100 shown in FIG. 1, the system includes a web server 104, a local database server 105, and an administrative interface 106 in addition to evaluation engine 101. Web server 104 provides an interface across the Internet 107 to collect data for a given evaluation. In some implementations, web server 104 provides interface web pages which may be displayed on a user's device via a web browser executing on the device, and these interface web pages allow a user to input data for an evaluation or provide instructions to the user. In other implementations of the invention, web server 104 may also or alternatively interact with an application executing on a user's device to receive data for an evaluation and to provide user instructions. Examples of these web pages or application pages are illustrated in FIGS. 3-16 and will be described below in connection with the example method shown in the flow charts of FIGS. 2A-2F. Web server 104 also provides interface web pages or may interact with a remotely executing application to receive configuration instructions and evaluation rules from a client to be applied to evaluations performed for that specific client. Additionally, web server 104 may be used in cooperation with administrative interface 106 to allow administrative functions associated with the evaluation system, such as reporting and database updates. Local database server 105 shown in illustrative evaluation system 100 stores and provides access to a database or databases of various information needed by the evaluation engine for performing an evaluation and producing a damage repair estimate. In particular, local database server 105 may store repair data in the form of information relating potential damage level and location information to part data and labor cost data which the evaluation engine 101 applies in performing an evaluation.

A third-party database 110 is shown in FIG. 1 as being accessible to evaluation system 100 across the Internet 107. Third-party databases such as database 110 may be accessed by evaluation system 100 to obtain vehicle information or other information necessary in performing an evaluation. Examples of third-party databases which may be accessed by evaluation system 100 will be described below in connection with FIG. 2B.

FIG. 1 also shows example user and client devices which may be used to interface with evaluation system 100. Clients may be entities such as insurance companies that commonly have a need for a damage evaluation and damage repair estimate. Thus FIG. 1 shows insurance company client device 112, which may be a personal computer or other Internet enabled device which a client employee uses to interface with evaluation system 100. It should be noted, however, that clients of evaluation system 100 are not limited to insurance companies. For example, companies such as rental car companies and other companies that operate fleets of vehicles may also be clients of evaluation system 100. Also, entities such as parking garages which temporarily take custody of vehicles may be clients of evaluation system 100. Client device 114 in FIG. 1 may thus be a device such as a personal computer or other Internet enabled device used by a rental car company employee, a parking garage company employee, or an employee of any other type of company requiring damage evaluation services. It will be appreciated that client devices 112 and 114 communicate with evaluation system 100 via a suitable mechanism such as web server 104, either through a web browser or via a client program specifically adapted to communicate with the web server.

The users of evaluation system 100 are persons who interface with the system to initiate an evaluation session. Users may be client insurance company customers such as a customer interfacing with evaluation system 100 through user device 115. It is also possible for individuals acting as an employee or agent of a client to serve as a user or to assist a user/customer in interacting with evaluation system 100. Of course, the invention is not limited to any particular type of user, and thus a user interacting with evaluation system 100 through user device 116 in FIG. 1 may be any type of user that has access to the evaluation system 100 to initiate a damage evaluation and obtain a damage repair estimate. A benefit of evaluation system 100 is that users (such as users operating user devices 115 and 116 in FIG. 1) need have no expertise or experience in evaluating damages and producing damage repair estimates. Rather, users need only follow the instructions provided via web server 104 or the web server in combination with a client application on their user device to input data on which evaluation system 100 operates to perform an evaluation and produce a damage repair estimate.

The example evaluation system 100 shown in FIG. 1 relies on the Internet to facilitate communications with user devices 115 and 116, client devices 112 and 114, and third-party database 110. It should be appreciated that while the invention is well adapted for application of Internet-based communications, the invention is not limited to Internet communication with users and clients or other entities, and is not limited to any particular type of network communication or communications protocols. Also, it will be appreciated that the simple schematic representation of the system shown in FIG. 1 is not intended to imply any particular network topography or data processing arrangement is required for implementing the invention. For example, although FIG. 1 shows the separate local database server 105, web server 104, and evaluation engine 101, it will be appreciated that all of these elements may be implemented on the same physical data processing device. Also, the various functions of local database server 105, web server 104, and evaluation engine 101 may be distributed among any arrangement of different data processing devices. Any of the data processing devices employed to implement evaluation system 100 may be personal computers or server computers with sufficient memory and other resources to execute the program code providing the various functions, and with suitable interface controllers to facilitate the required communications with other system components.

As noted above, the present invention also encompasses program products stored on tangible media or other data storage devices. These program products are executable to provide the functionality described above in connection with FIG. 1 and as described below in the flow charts shown in FIGS. 2A through 2F. The various processing devices may execute grid correlation program code to cause the grid-associated section representations to be displayed on the respective user device. Input program code may be executed to receive the product identifying information, section inputs identifying damaged product sections, and damage severity level inputs. Both the grid correlation program code and the input program code may, for example, be executed by web server 104. Alternatively or in addition to programs executed by web server 104, aspects of the input program code or other program code according to the present invention may be executed at the user device (such as user devices 115 and 116 in FIG. 1). Evaluation program code may be executed by evaluation engine 101 or some other suitable processing device to retrieve damage estimate data from the repair data store and to produce the desired output, such as a repair cost estimate.

FIGS. 2A through 2F together provide a flow chart showing an example method according to one form of the invention. This overall flow chart represents a process performed by evaluation system 100 for a single evaluation session involving a single damaged vehicle or other product for which the damage is to be evaluated. For example, assume that a user such as an insurance company customer-user using device 115 has an accident in the user's car. The user may begin an evaluation session which is then conducted according to the process flow shown in FIGS. 2A through 2F to allow the evaluation system to evaluate the damage to the vehicle and produce a damage repair estimate. It will be noted that some of the process steps shown in FIGS. 2A through 2F are steps in which the evaluation system (such as system 100 in FIG. 1) causes a user device such as a smartphone, PC, laptop, tablet, or other Internet enabled device to display certain graphical user interfaces in the form of web pages, on-screen display, or in the form of displays controlled by an evaluation system program product application executing on the user device (such as devices 115 and 116 in FIG. 1). FIGS. 3 through 16 show representative interface displays which the evaluation system (such as system 100 in FIG. 1) may cause to be displayed at the user device. These interface displays will be discussed below in connection with the various flow chart elements with which they are associated.

As noted above, evaluation methods, systems, and program products according to the invention are not limited to the evaluation of vehicle damage. However, the application to vehicle damage is certainly an important application of the invention, and provides a good example for the purposes of disclosing the various features and characteristics of the invention. It should be borne in mind throughout the discussion of FIGS. 2A through 2F that this method is simply an example and that methods according to the invention may be applied to evaluations for other products with little or no variation from illustrated steps.

Figure 2A:
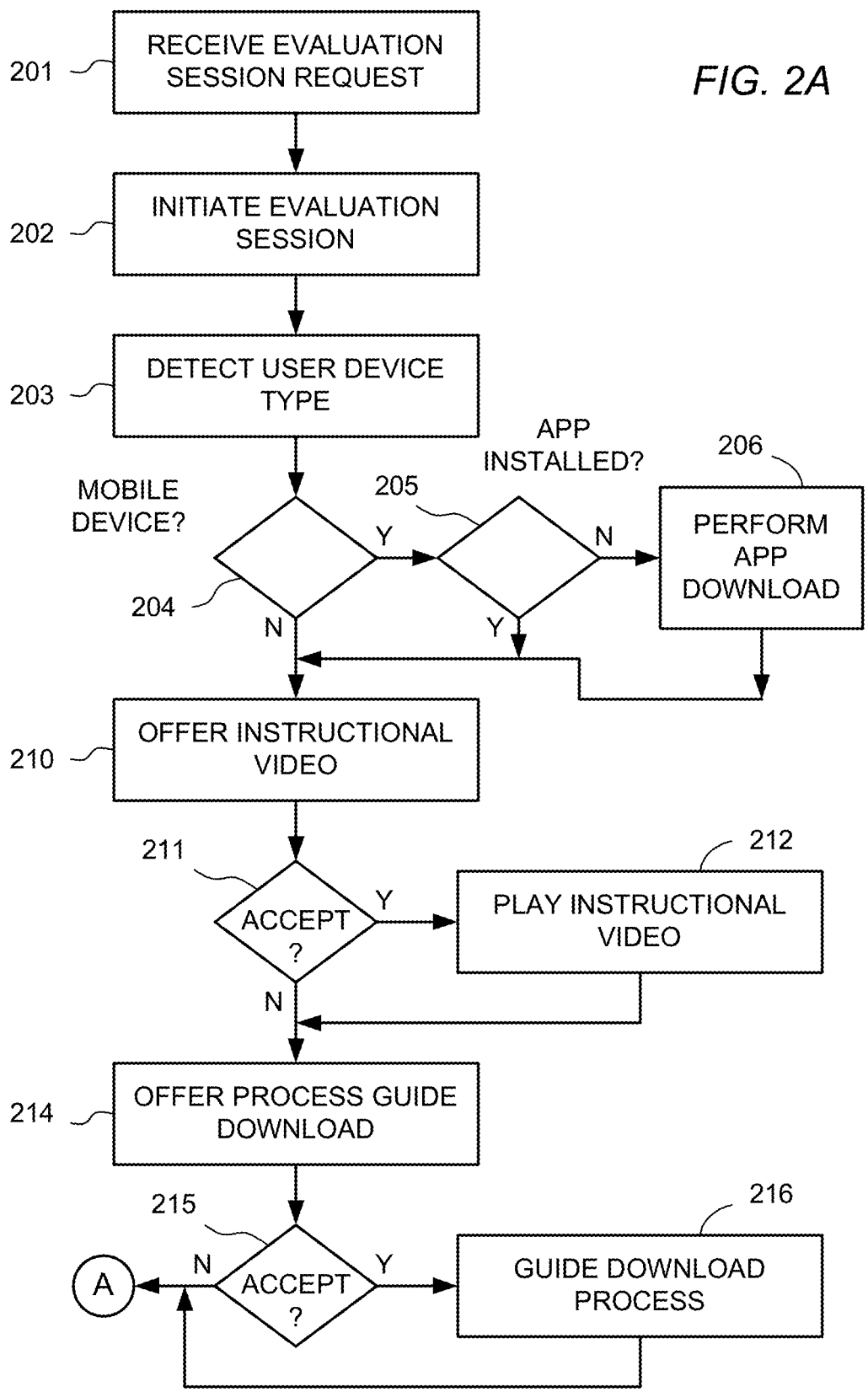
FIG. 2A is a first portion of a flow chart illustrating a method according to one embodiment of the present invention.

Referring to FIG. 2A an evaluation method according to the invention may start with receiving an evaluation session request as indicated at process block 201. In response to receiving the evaluation session request, the method initiates an evaluation session as indicated at process block 202. These two steps, receiving an evaluation session request and initiating an evaluation session may be performed in a number of different fashions within the scope of the invention. In one preferred form of the invention, a client insurance company may provide an Internet web page for their insurance customers, and this web page may provide information regarding the insurance company's claims process together with an Internet link which directs the inquiring customer to a web page provided through an evaluation system web server such as web server 104 shown in FIG. 1. The step of receiving the evaluation session request in this example may comprise the insurance customer's invoking the link on their insurance provider's website or making some other input once they have navigated to that link. Alternatively, the user of the evaluation system may simply navigate directly to the website hosted by web server 104. In this latter case the evaluation session request is received directly through the evaluation system starting webpage. In yet another alternative, the evaluation session request is received through a web server such as web server 104 in FIG. 1 via an evaluation system-specific application executing on the user device. Regardless of how the evaluation session request is received, the process of initiating the evaluation session as shown in process block 202 may include making certain database entries for the session through web pages, device applications, or other input platforms.

Once the evaluation session is initiated at process block 202 in FIG. 2A, the illustrated method includes detecting the user device type as shown at process block 203. This device type detection may be performed by any suitable detection technique now known in the art or developed in the future. If the user device is a mobile device and does not have an evaluation system-specific application installed, it is potentially desirable (given the current state of technology for communications with a mobile device) to install such an application on the device rather than relying on the general web browser interface that the mobile device may have. Thus if the user device is a mobile device as indicated by the outcome at decision box 204, and if no evaluation system-specific application is installed on the mobile device as indicated by a negative outcome at decision box 205, the method proceeds to perform an application download and installation as shown at process block 206. If the user device is not a mobile device, or if the evaluation system application is already installed on the device, or once the application download and installation is completed at process block 206, the method continues to provide the user options to obtain instructional information on the evaluation process. In particular, the method may offer to display an instructional video to the user as indicated at process block 210 and may offer an evaluation process guide download as indicated at process block 214. These method steps may include causing the user device to display one or more graphical user interfaces which give the user the option of taking the particular instructional action. If the user accepts the offer as to the instructional video as indicated by an affirmative outcome at decision box 211, the evaluation system proceeds to cause the user device to play the instructional video as indicated at process block 212. If the user accepts the offer of the process guide download as indicated by a positive outcome at decision box 215, the evaluation system begins to perform the guide download process as indicated at process block 216. Once the instructional actions are taken, or it they are declined, the method continues to the portion shown in FIG. 2B.

Figure 2B:
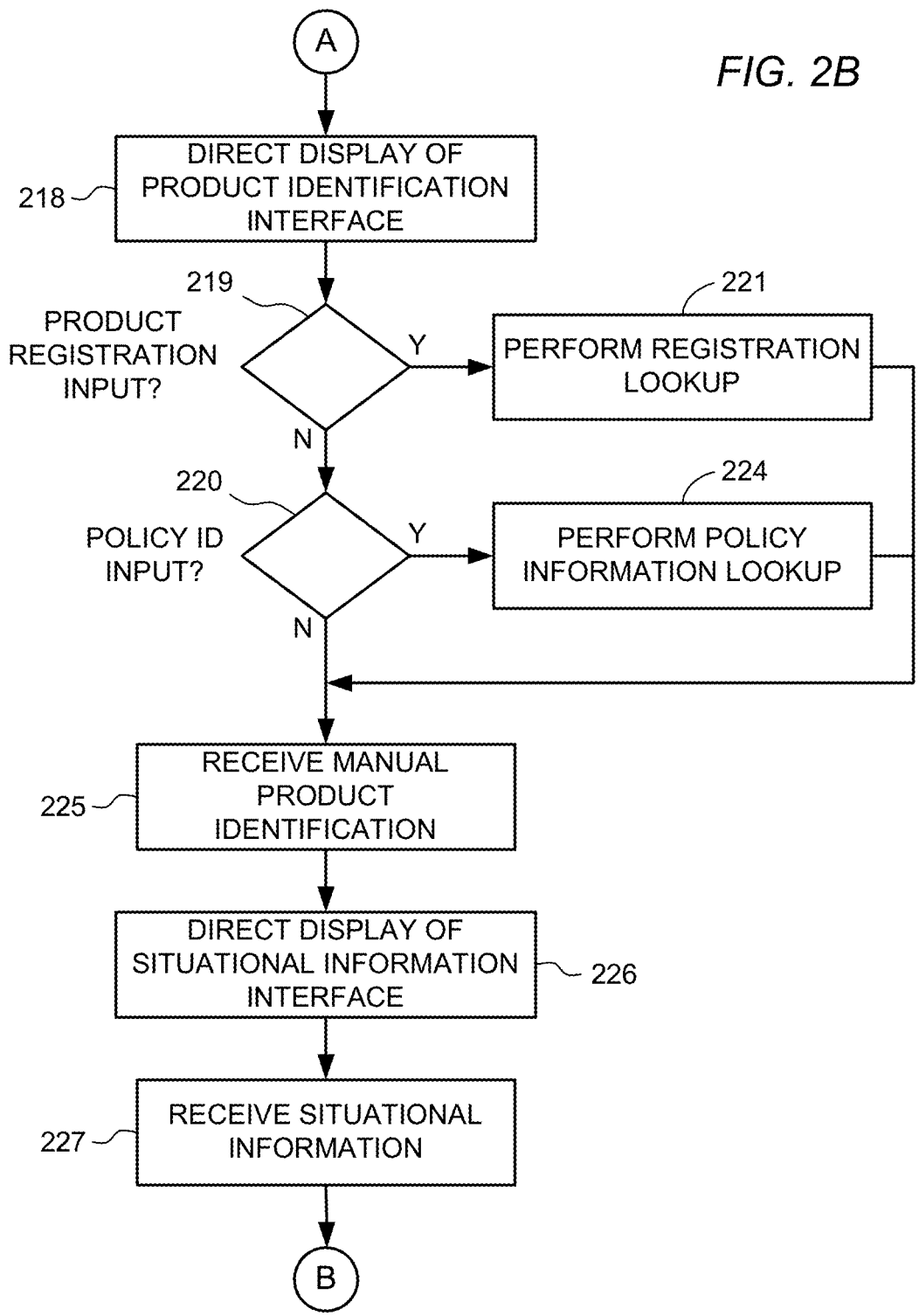
FIG. 2B is a second portion of the flow chart illustrating a method according to one embodiment of the present invention.
Figure 3:
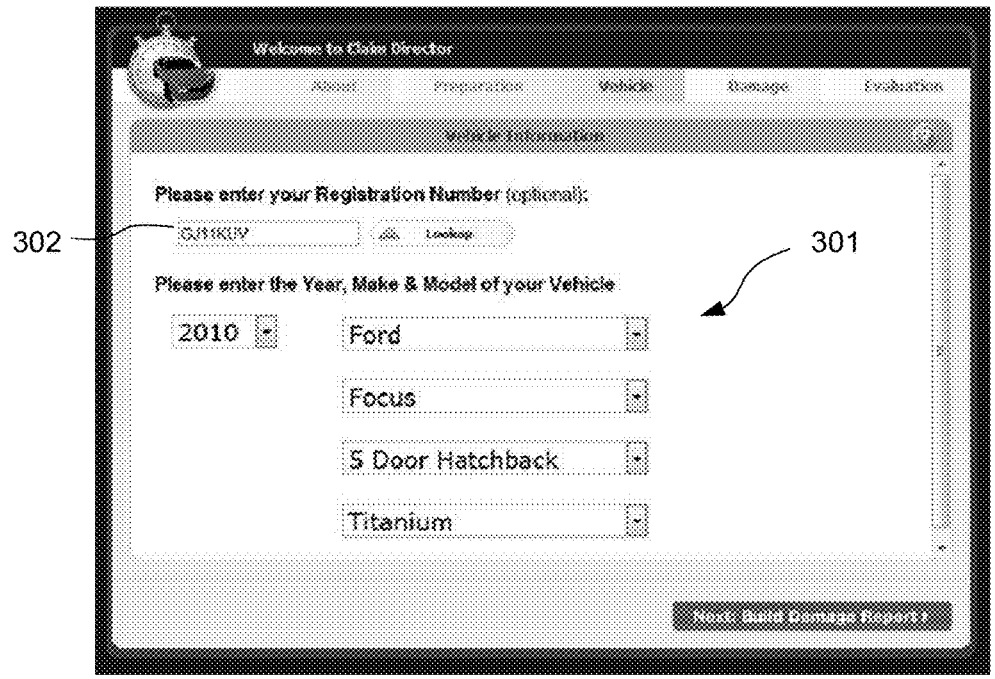
FIG. 3 is a representation of a first interface display which may be produced for a system user according to an embodiment of the invention.
Figure 4:
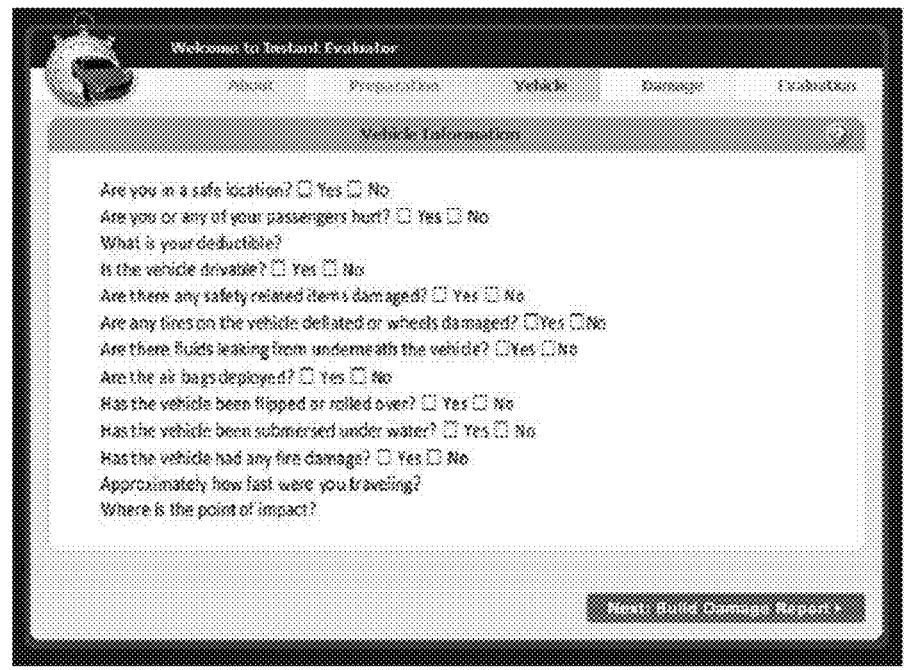
FIG. 4 is a representation of a second interface display which may be produced for a system user.

The portion of the example evaluation method shown in FIG. 2B involves steps to identify the damaged vehicle which is the subject of the evaluation session, and collect other general information which may affect the evaluation. In particular, the method includes directing the user device to display a product identification interface as indicated at process block 218. FIG. 3 provides an example of a product identification interface. This particular interface provides an option of manually entering vehicle type information through a series of drop-down menus 301, or the option of entering a registration number/identifier for the vehicle in a field 302. Although not shown in FIG. 3, another option for entering vehicle identifying information is to enter an insurance policy number that is associated with the user's damaged vehicle which is the subject of the evaluation session. In light of these options the method shown in FIG. 2B includes determining whether a vehicle registration number or identifier has been input as indicated by the outcome at decision box 219, and determining whether a policy identifier has been entered as indicated by the outcome at decision box 220. If a vehicle registration number/identifier is entered (such as in field 302 in FIG. 3 for example), the evaluation system performs a lookup for that number/identifier as indicated at process block 221. This step at block 221 may require a query from evaluation system 100 to a third-party database such as third-party database 110 shown in FIG. 1. Alternatively the registration number/identifier lookup may require a query to an internal database or a database maintained by an insurance company client which insures the user. If a policy identifier is entered, a lookup is performed for that policy identifier as indicated at process block 224. It should be noted here that since there may be more than one vehicle associated with a given insurance policy, an additional interface display may be produced at the user device to show a list of the vehicles from which the user may choose the correct vehicle. Alternatively to identifying the vehicle through a registration lookup or insurance policy identifier lookup, the method may include simply receiving a manual product identification as indicated at process block 225 in FIG. 2B. This manual identification may be obtained via the pull-down menu fields 301 shown in FIG. 3.

The process steps shown in FIG. 2B also include steps for obtaining other information which may be helpful in performing the vehicle damage evaluation or providing other services or assistance to the user. In particular, FIG. 2B includes directing the user device to display a situational information interface as indicated at process block 226 and receiving situational information as indicated at process block 227. The situational information may include numerous types of information relevant to the evaluation to be performed. For example, the situational information interface may include a display such as that shown in FIG. 4, which asks a number of questions relating to the accident or to the type of damage which the vehicle has sustained. Follow-up screens providing additional information or requesting additional information may be produced depending upon the answers to the questions shown in FIG. 4.

Once the vehicle which is the subject of the evaluation session has been identified, the illustrated method begins steps necessary to obtain damage information needed for performing the evaluation and producing the damage repair estimate. These steps can be separated into different groups in FIGS. 2C through 2E. The upper portion of FIG. 2C includes steps associated with identifying discrete vehicle sections which have been damaged. The later processes shown in FIG. 2E loop back to these steps in FIG. 2C until all damaged sections have been identified. The lower portion of FIG. 2C and all of FIG. 2D include steps associated with obtaining a photograph of the given damaged vehicle section which has been identified and sizing the photograph as necessary for the present invention. The photograph in this particular embodiment of the invention provides the grid-associated representation which is used according to the invention to obtain damage level and location information according to the process steps shown in FIG. 2E.

Figure 2C:
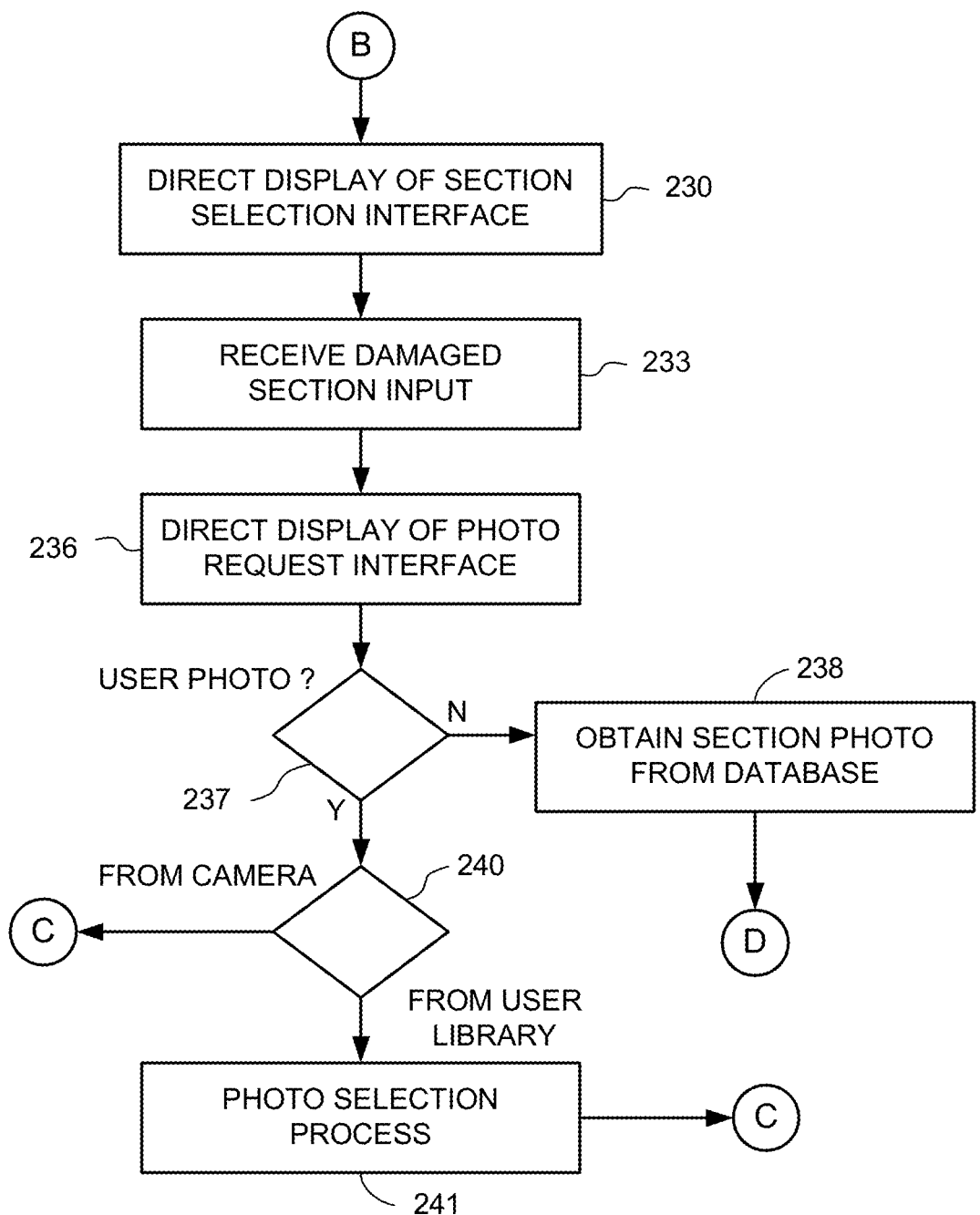
FIG. 2C is a third portion of the flow chart illustrating a method according to one embodiment of the present invention.
Figure 5:
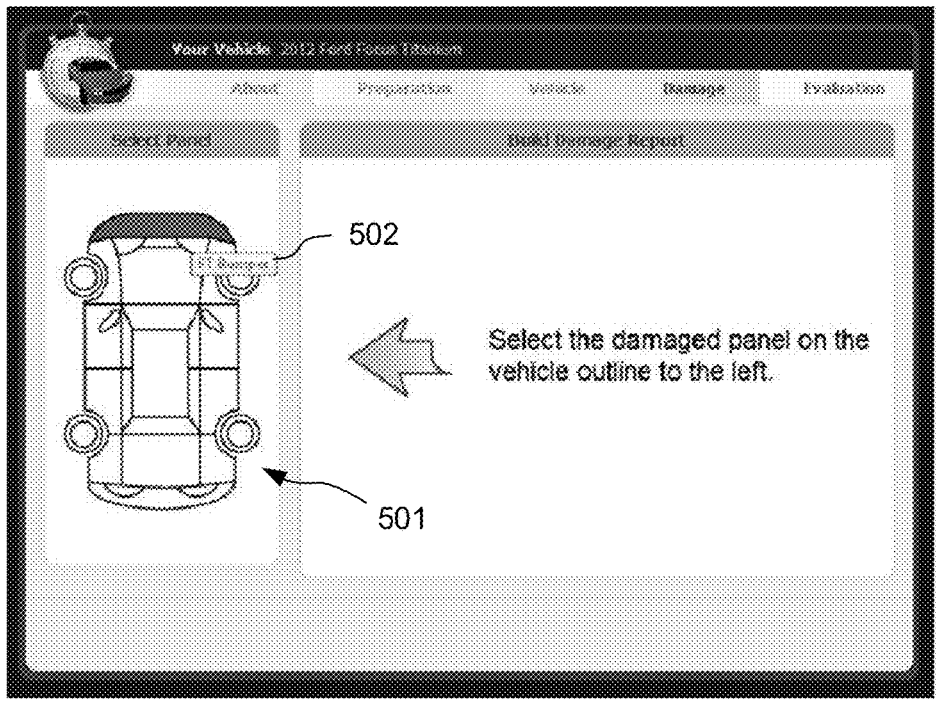
FIG. 5 is a representation of a third interface display which may be produced for a system user.
Figure 6:
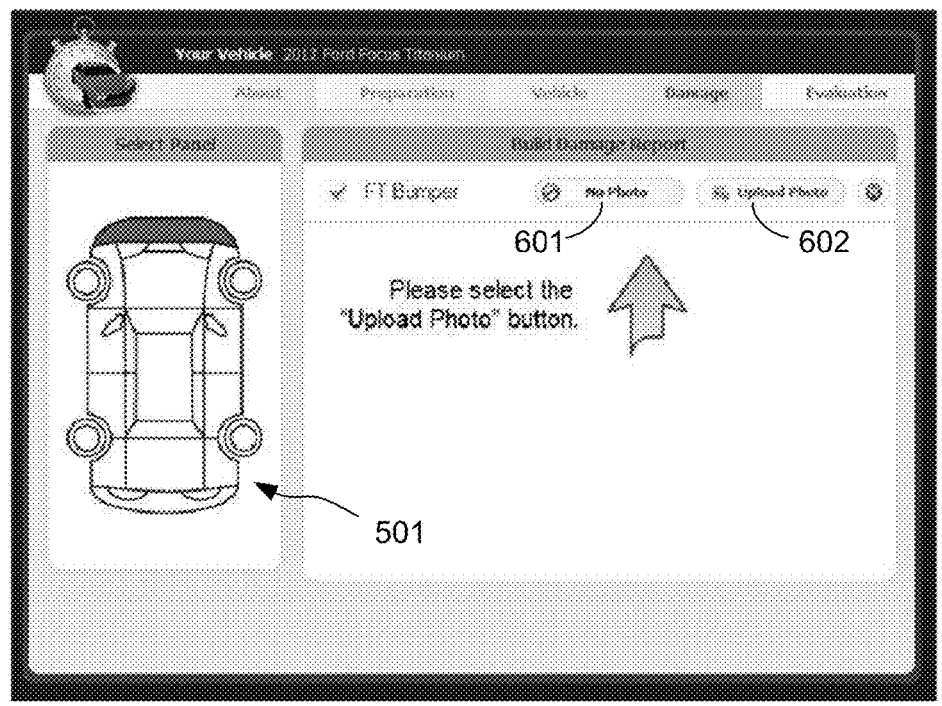
FIG. 6 is a representation of a different state of the interface display shown in FIG. 5.

Referring to FIG. 2C the example method includes directing the user device to display a section selection interface as indicated at process block 230. This interface allows the user to input, and the evaluation system to receive, a damaged section input as indicated at process block 233. The received damaged section input identifies a section of the vehicle which has been damaged. FIGS. 5 and 6 show an example section selection interface which may be displayed in accordance with process block 230 in FIG. 2C. The example section selection interface of FIGS. 5 and 6 includes a sectioned representation of the vehicle 501 which has been identified earlier in the process. This sectioned representation 501 allows the user to easily select the section or sections which have been damaged. In particular, the user may simply select a vehicle section by touching the section in the event the user device is a touch screen device, or may select a vehicle section with a pointer for other types of user devices. The example of FIGS. 5 and 6 indicates that the vehicle front bumper has been selected (as indicated by the text tag 502 in FIG. 5 and change in the color of the front bumper in both figures).

Referring again to FIG. 2C, the illustrated method also includes causing the user device to display a photo request interface as indicated at process block 236. There are a number of options according to the invention for providing a photo (or other representation). The three options covered in the example method include receiving the desired section photo directly from the user's camera (such as a camera associated with a smartphone or tablet computer), receiving the photo from a library of photos previously stored at (or accessible from) the user's device, and from a library stored in the evaluation system or a third-party database accessible to the evaluation system.

In the event the user does not have a photo of the damaged section of the vehicle as indicated by a negative outcome at decision box 237, the process proceeds to obtain a section photo from a database of such photos as indicated at process block 238. This database may be available through local database server 105 or from a third-party database such as database 110 (both in FIG. 1). If the user does have a photo to be uploaded directly from the user's smartphone or tablet camera application as indicated by the "from camera" outcome at decision box 240, the method proceeds to the resizing steps shown in FIG. 2D which will be described below. If the user photo is from the user's library of photos and other data, the method proceeds to a photo selection process indicated at process block 241. This photo selection process may include causing the user device to display a photograph library or file folders on the user device, and ultimately allowing the user to select a particular photo. Once the photo is uploaded according to the photo selection process at block 241, the method continues to the resizing steps shown in FIG. 2D. It should be noted that the method may begin the photo selection process from an interface display such as that shown in FIG. 6, using the controls 601 or 602 which are displayed in the example interface once the damaged vehicle section is selected.

Figure 2D:
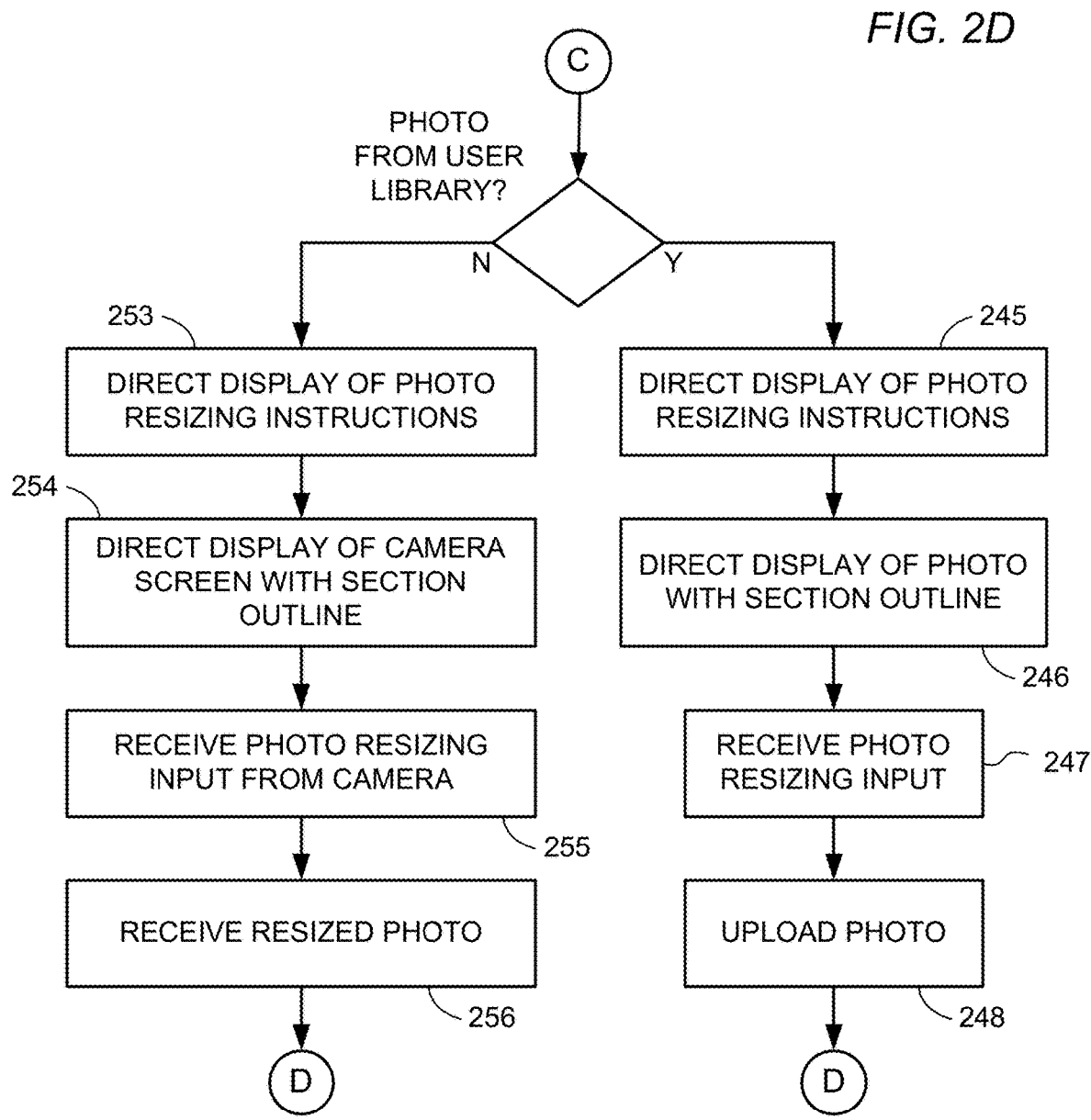
FIG. 2D is a fourth portion of the flow chart illustrating a method according to one embodiment of the present invention.
Figures 7, 8:
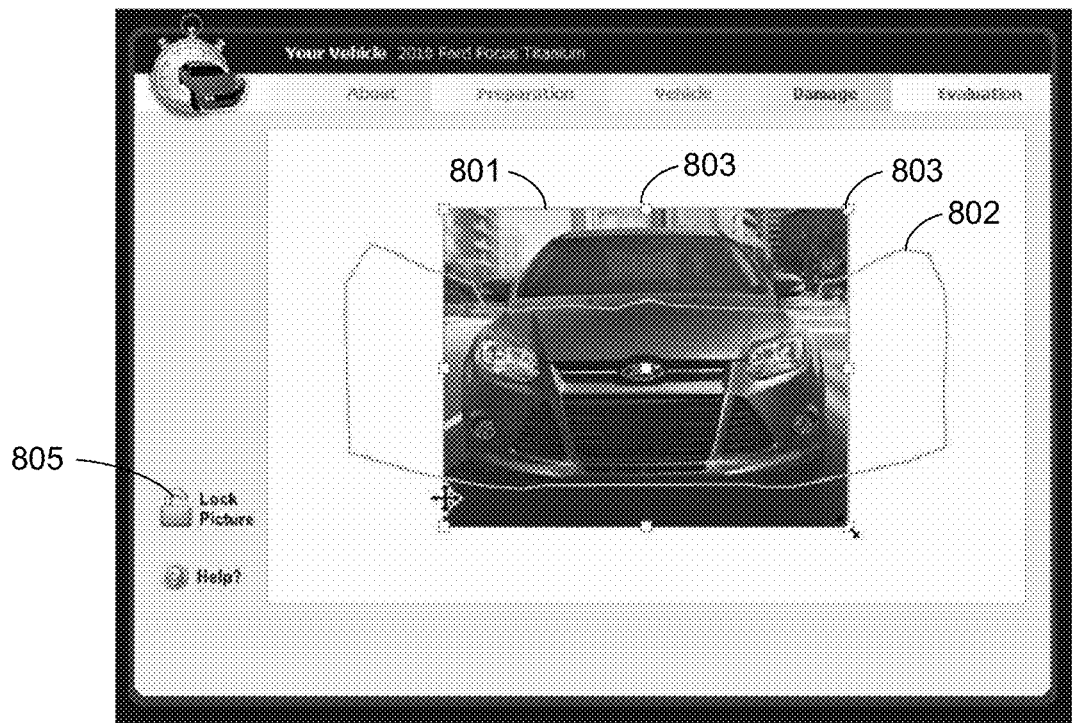
FIG. 7 is a representation of a fourth interface display which may be produced for a system user.
FIG. 8 is a representation of a fifth interface display which may be produced for a system user.
Figure 9:
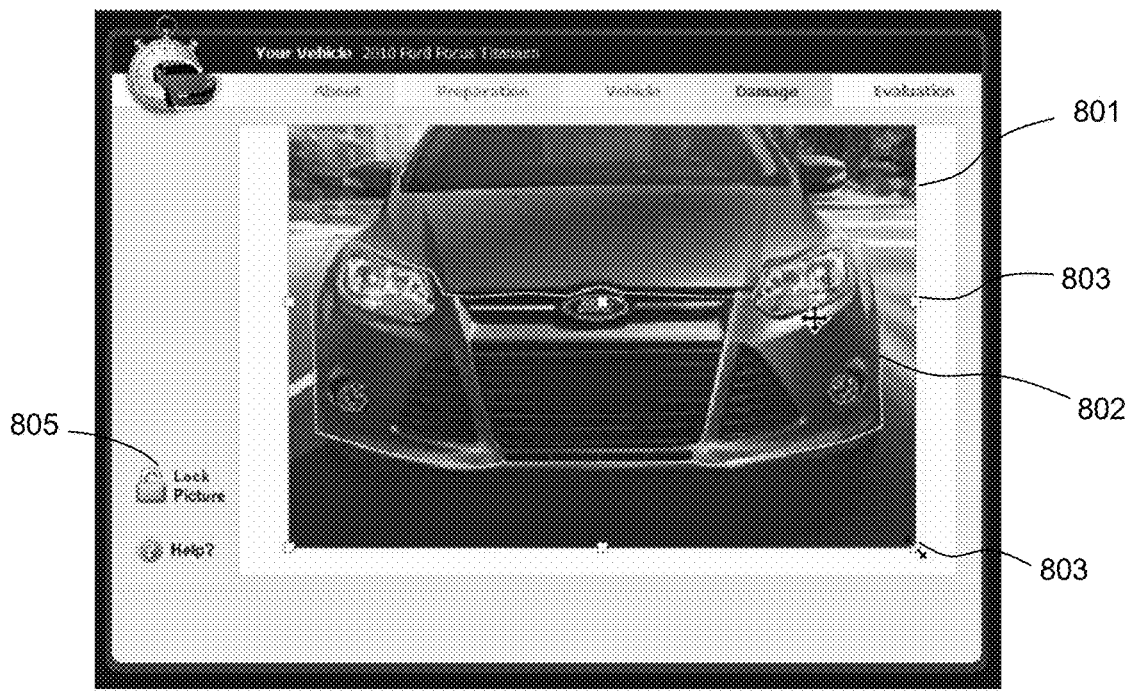
FIG. 9 is a representation of a different state of the interface display shown in FIG. 8.

Referring to FIG. 2D the example method follows one of two different photo resizing processes depending upon whether the photo is uploaded from a user library or is obtained directly from the user's camera associated with their smartphone or tablet. In the event the photo is uploaded from the user's library, the process includes causing the user device to display photo resizing instructions as indicated at process block 245. The process also includes causing the user device to display the uploaded photograph with a section outline as indicated at process block 246. FIG. 7 shows an example of photo resizing instructions which may be displayed in accordance with process block 245, while FIG. 8 provides an example of a section outline display according to process block 246. This example of FIG. 8 shows the uploaded photograph 801 and a section outline 802 to be used to resize the photograph to the size required by the evaluation process. In particular, the user may use handles 803 associated with the photograph to adjust the size of the photograph until the outline of the car matches section outline 802. FIG. 9 shows the state of the interface display after the user has adjusted the photograph 801 to match the section outline 802. Ultimately, a photo resizing input is received as indicated at process block 247 in FIG. 2D, with the result being that the photograph is resized to match the displayed section outline 802. A photo locking input may be made by invoking control 805 in FIGS. 8 and 9, and this photo locking input may represent the photo resizing input received at block 247 in FIG. 2D. As will be described below in connection with FIG. 2E and FIGS. 18 and 19, the photo resizing facilitates the matching of damage level indications to a specific part of the damaged vehicle section. This in turn allows evaluation engine (101 in FIG. 1) to retrieve the correct damage repair data and produce a more accurate damage repair estimate as will be described below in connection with FIG. 17.

In the event the photo is obtained from the user's camera, the steps shown in FIG. 2D leverage the capabilities of the user device itself to resize the photo before uploading the resized photo to the evaluation system (100 in FIG. 1). In this case the method includes first causing the user device to display photo resizing instructions as indicated at process block 253 in FIG. 2D. These may be instructions similar to those shown in FIG. 7. The process next includes causing the user device to display the photograph on the user device with a section outline as indicated at process block 254, and then receiving a photo resizing input from the camera device as indicated at process block 255. The section outline display and resizing may be similar to that shown in FIGS. 8 and 9. This resizing input aligns the photograph with the section outline for the same purposes as those noted above in connection with process block 247. The resized and aligned photo may then be uploaded to the evaluation system (100 in FIG. 1) from the user device as indicated at process block 248.

It will be noted that photograph resizing steps are shown only for photographs obtained from the user and not for photographs obtained from a section database as shown at process block 238. It is assumed in this illustrated example process that a photograph obtained according to process block 238 is already sized correctly. However, other implementations may require resizing even photographs obtained from a section photo database.

Figure 2E:
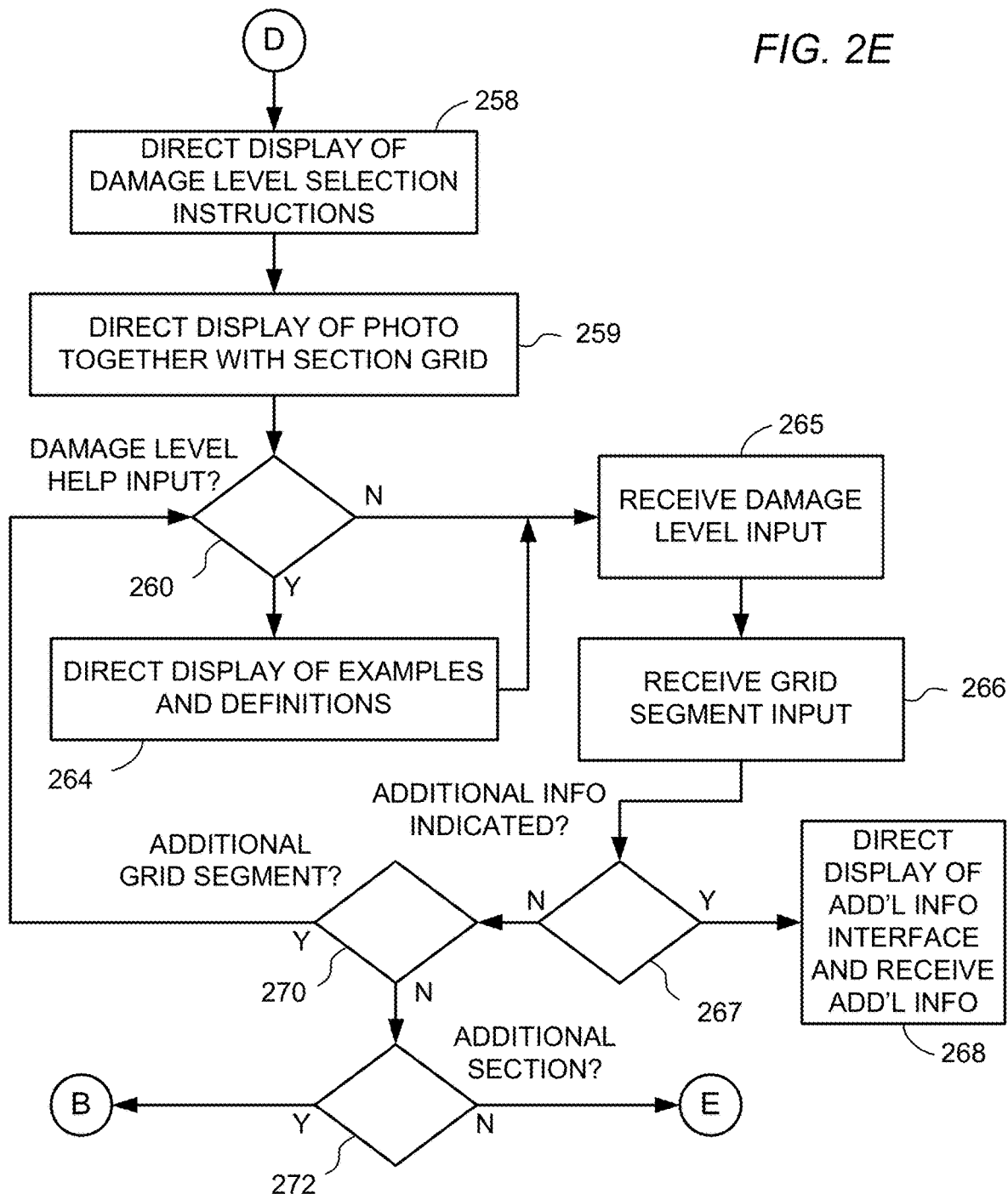
FIG. 2E is a fifth portion of the flow chart illustrating a method according to one embodiment of the present invention.
Figure 10:
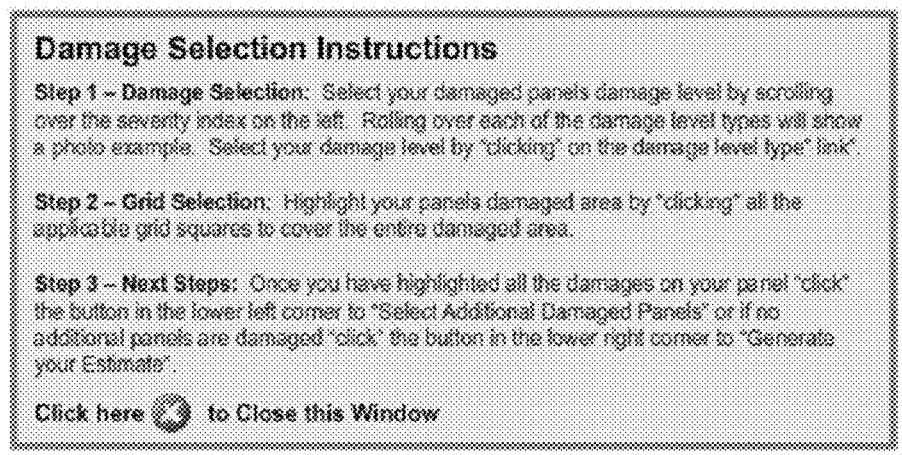
FIG. 10 is a representation of a sixth interface display which may be produced for a system user.
Figure 11:
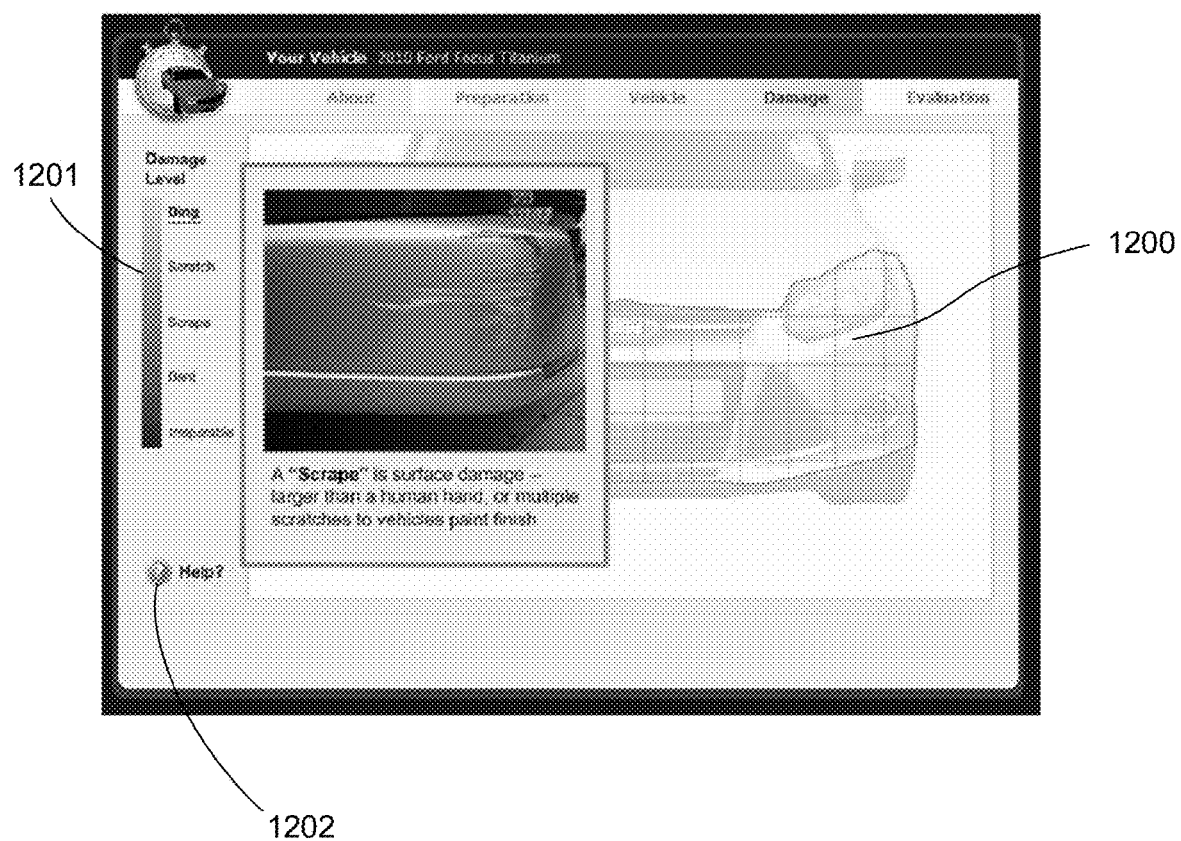
FIG. 11 is a representation of a different state of the interface display shown in FIG. 10.
Figure 12:
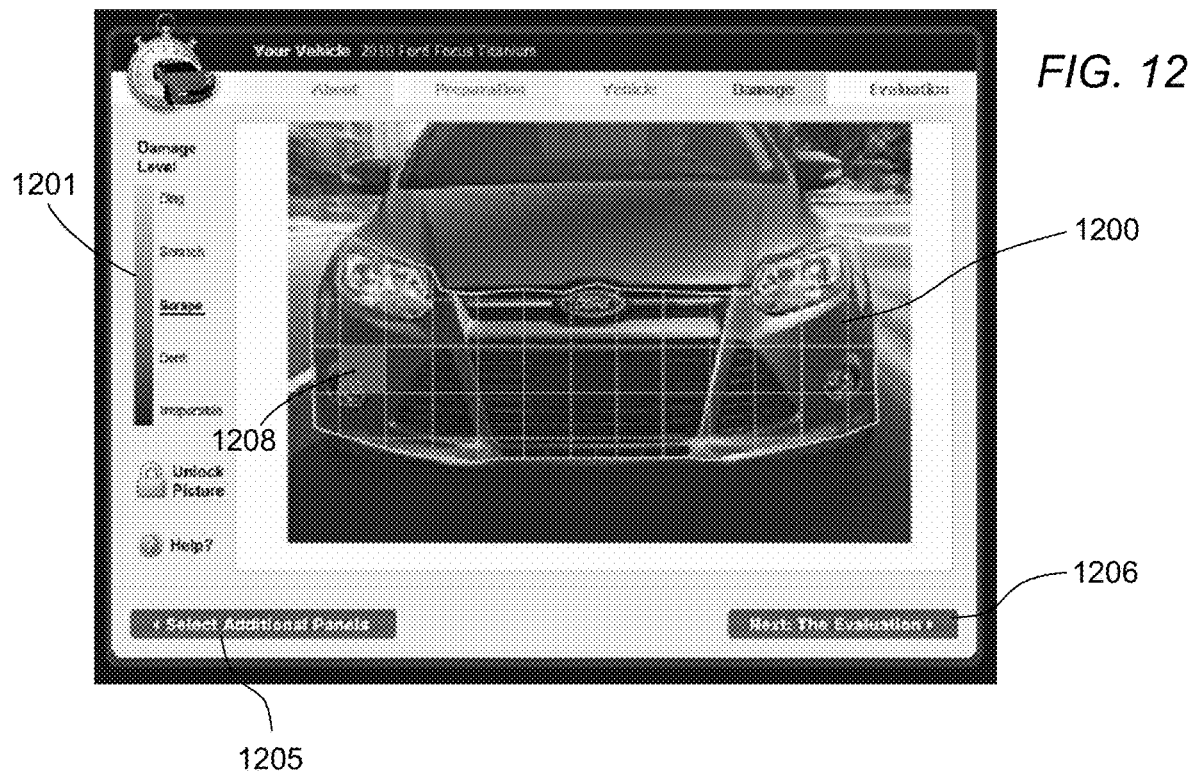
FIG. 12 is a representation of another different state of the interface display shown in FIG. 10.
Figure 13:
FIG. 13 is a representation of a seventh interface display which may be produced for a system user.
Figure 14:
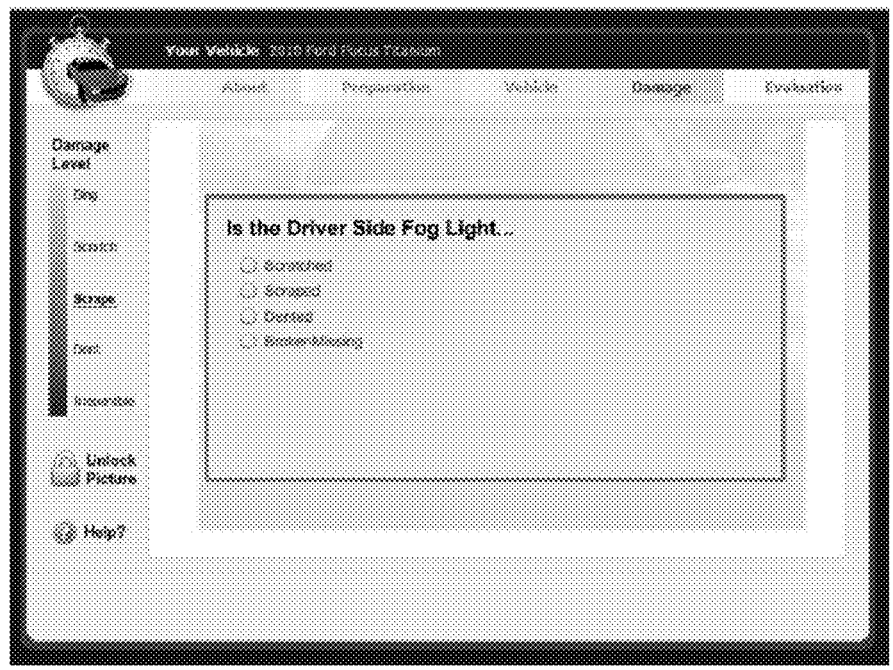
FIG. 14 is a representation of an eighth interface display which may be produced for a system user.

FIG. 2E includes steps associated with receiving an indication of the level of damage at specific locations of the given section of the vehicle. Preparatory to receiving damage level indications, the illustrated example method includes causing the user device to display damage level selection instructions as indicated at process block 258. An example of such a display is shown in FIG. 10. Once the instructions have been displayed, the illustrated method includes causing the user device to display the resized photo together with a grid 1200 for that particular section of the vehicle as indicated at process block 259. FIG. 12 provides an example of this photo and section grid display in which the grid is contained within an outline that matches the peripheral shape of the photo. This example represents a damage level association utility which allows the user to associate a particular level of damage with a particular grid segment encompassing the damage. At this point, rolling over a particular damage level, that is, a particular predefined damage severity indicator shown in the damage level scale 1201 in FIG. 12, causes the display to change to the display shown in FIG. 11 with a textual description and a photograph showing an example of that level of damage. The textual description and photographic example shown in FIG. 11 are each a predefined representation of that respective level of damage. The predefined damage severity indicators shown in the example of FIG. 12 include the different levels of damage labeled "Ding," "Scratch," "Scrape," "Dent," and "Irreparable." The user may request damage level help by invoking the "Help?" icon shown in both FIGS. 11 and 12. If the user requests help as indicated by an affirmative outcome at decision box 268 in FIG. 2E, the method continues to cause the user device to display examples and definitions of the various damage levels as indicated at process block 264. Once the examples are displayed, or if no damage level help is requested, the method includes receiving a damage severity level input represented by a selected one of the predefined damage severity indicators such as those labeled "Ding," "Scratch," "Scrape," "Dent," and "Irreparable" in the example of FIG. 12. Receiving the damage severity level input is indicated at process block 265 and receiving a grid segment input is indicated at process block 266 to associate the damage severity level input with a particular grid segment. In some cases, a particular damage severity level input for a particular grid segment may indicate that an additional question should be asked of the user to help facilitate a more accurate evaluation. If this is the case as indicated by an affirmative outcome at decision box 267, the method includes causing the user device to display a suitable inquiry for additional information as indicated at process block 268. FIG. 13 provides an example of such an additional request for information, while FIG. 14 provides an example of a follow up display in the event the user answers the inquiry shown at FIG. 13 in the affirmative.

If no additional information is indicated by the received damage severity level input and grid segment input from process blocks 265 and 266, respectively, the method includes looping back through process blocks 260, 264, 265, and 266 if there is an additional grid segment which requires a damage severity level input as indicated by the outcome at decision box 270. Otherwise, in the event of a negative outcome at decision box 270, and if there is an additional damaged section of the vehicle as indicated by an affirmative outcome a decision box 272, the method returns to the process for selecting a section in FIG. 2C. In the example interface display shown in FIG. 12, the user may invoke the "Select Additional Panels" control 1205 to return to the section selection process and select another damaged section of the vehicle. Otherwise, if there are no additional damaged sections, the process proceeds to the evaluation and reporting processes shown in FIG. 2F. In the example of FIG. 12, the user may move to the evaluation interface displays by invoking the "Next: The Evaluation" control 1206 in FIG. 12.

It should be noted that some forms of the invention may not show the grid 1200 shown for purposes of example in FIGS. 11 and 12. Rather, the grid may not be visible to the user. However, even in implementations in which a grid such as grid 1200 in FIG. 12 is not shown, the displayed section representation (the photograph) is still associated with a grid such that each grid segment covers a different area of the section representation. Thus even where the grid is not displayed to the user, the user's selection of a damaged area of the section effectively selects the grid area associated with that damaged area. The selected grid area may still be highlighted when the associated section area is selected, and this highlighting may be shown as in the example at 1208 of FIG. 12, although the remainder of the grid would still not be displayed.

Figure 2F:
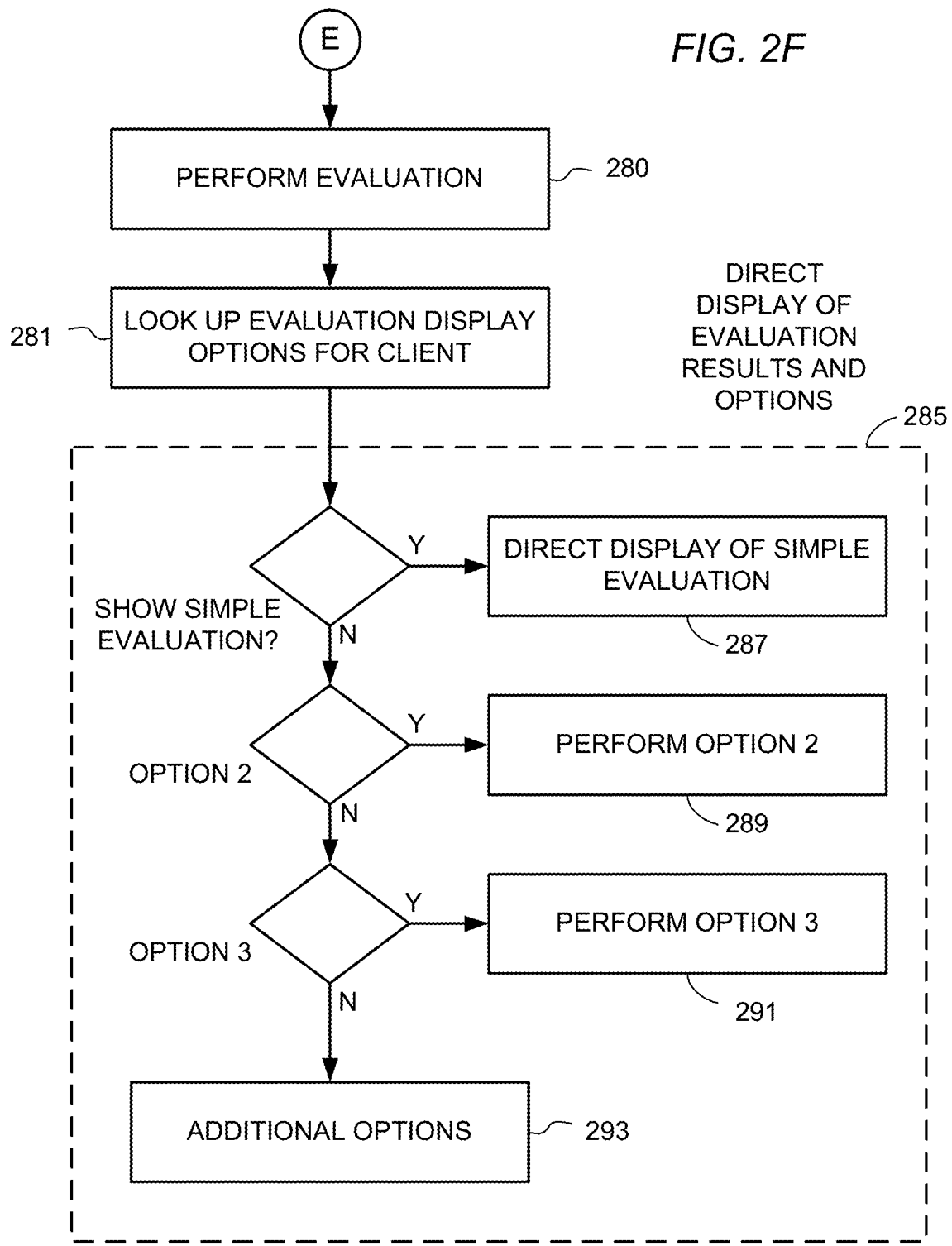
FIG. 2F is a sixth portion of the flow chart illustrating a method according to one embodiment of the present invention.

The various steps of the example process shown in FIGS. 2A through 2E have provided the evaluation system (100 in FIG. 1) with all of the vehicle identification information, situational information, and vehicle damage information necessary for the evaluation system to perform an evaluation of the damage and provide results of the evaluation. The evaluation step is shown in FIG. 2F at process block 280. Further discussion of the evaluation step will be set out below in connection with FIGS. 17 and 18.

In addition to showing the evaluation step, FIG. 2F also shows the step of looking up evaluation display options for a client which may be associated with the evaluation. This lookup step is shown at process block 281 in FIG. 2F. For example, where the user is a customer of an insurance company which is a client of the evaluation system, the insurance company client may have set certain options for the display of evaluation results for its customers. The lookup at process block 281 obtains the display options for the client, or default display options in the event there is no client or the client has not selected any particular display options for the evaluation results. These display options may be defined in the system as client rules as discussed below in connection with FIG. 18. As will be discussed in connection with FIG. 18, such client rules and other rules may be retrieved as part of the evaluation process rather than as a separate step after evaluation as shown in FIG. 2F. In any event, once the options are known, the process causes the user device to display the evaluation results and options as indicated by the steps in dashed box 285. For example, the display process may give the user the option of selecting between a simple evaluation or other options. If the user selects a simple evaluation, the process causes the user device to display the simple evaluation as indicated at process block 287. Alternatively, if the user selects a second option or third option or additional option, the method includes performing the selected evaluation display option as indicated at process block 289, 291, and 293.

Figure 15:
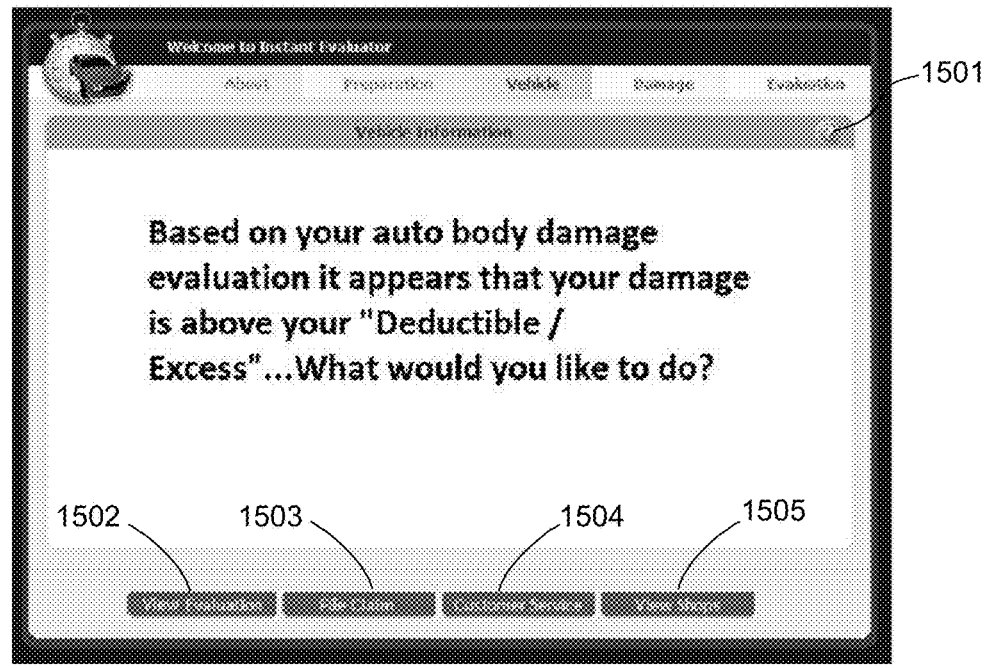
FIG. 15 is a representation of a ninth interface display which may be produced for a system user.

FIG. 15 provides an example of an interface display which the evaluation system (100 in FIG. 1) may cause the user device to display as indicated at dashed box 285 in FIG. 2F. This particular interface is appropriate for a user who is a customer of an insurance company, and provides controls to select four different options in addition to invoking the "?" help icon 1501. Control 1502 may be invoked to cause the user device to display the result of the evaluation, that is, a damage repair estimate. Control 1503 may be invoked to initiate a claim filing process through the insurance carrier. Control 1504 may be invoked to contact customer service for the user's insurance company through a suitable contact process, such as live chat or email. Control 1505 may be invoked to cause the user device to display nearby repair shops for repairing the damaged vehicle. It should be noted that while the option interface shown in FIG. 15 is displayed at the user device under the control of the evaluation system, some of the controls may comprise links that take the user out of the evaluation system. For example, the "File Claim" control 1503 may take the user to an insurance company web page for initiating a claim, and the "Customer Service" control 1504 may take the user to an insurance company website. It should also be appreciated that some of the display screens which may be displayed in response to a control in FIG. 15 may allow the user to navigate back to the option page. For example, the evaluation report displayed in response to invoking the "View Evaluation" control 1502 in FIG. 15, may allow the user to return to the interface of FIG. 15 from the evaluation report so that the user may select another one of the options.

Figure 16:
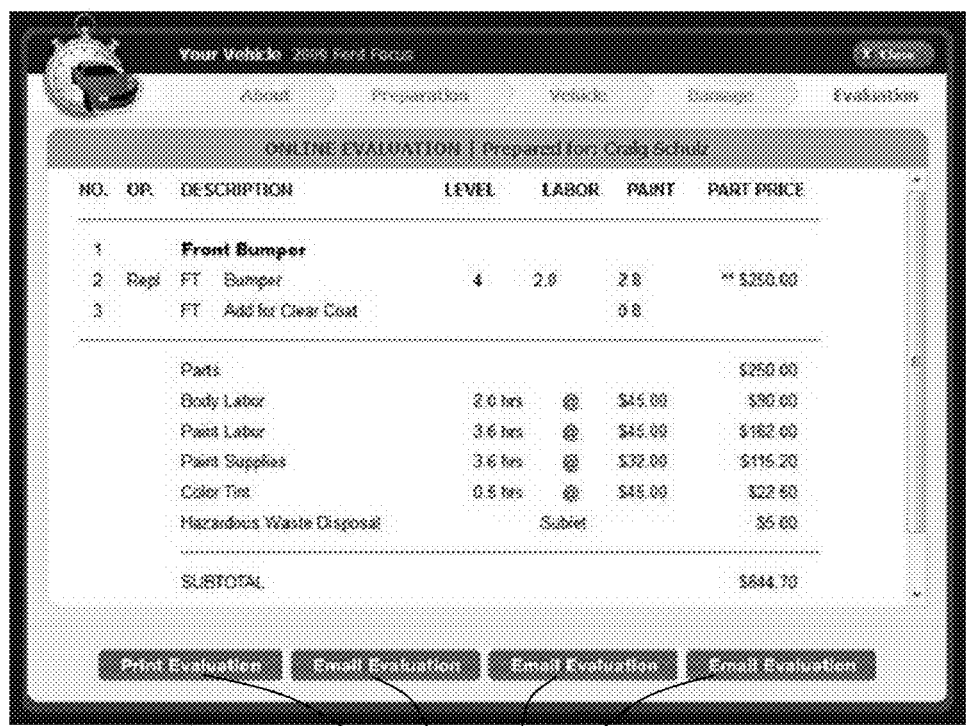
FIG. 16 is a representation of a damage repair estimate which may be produced for a system user.

FIG. 16 illustrates an example evaluation result (damage repair estimate) which may be displayed to the user through the user device. The evaluation system may, for example, cause such a result to be displayed at the user device in response to the user's selection of the "View Evaluation" control 1502 shown in FIG. 15. The evaluation result display may itself include a number of controls 1601 enabling the user to print the report, email it, or take some other action.

Figure 17:
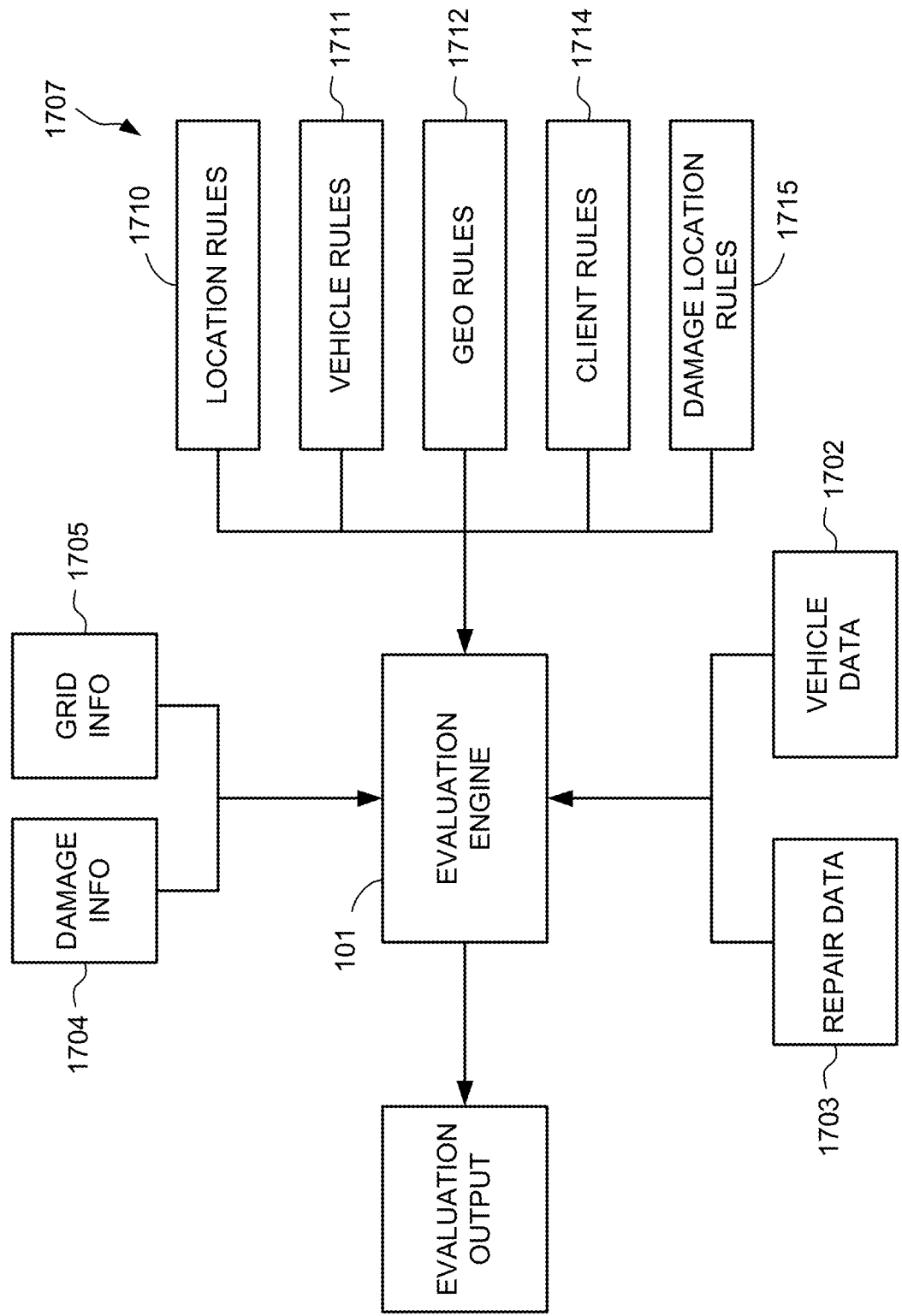
FIG. 17 is a diagrammatic representation of the flow of data to and from an evaluation engine according to one form of the present invention.

FIG. 17 diagrammatically illustrates the flow of data to and from evaluation engine 101, which performs damage evaluations based on vehicle data 1702, repair data 1703, damage severity information 1704, and grid information 1705. Vehicle data 1702 comprises data which defines the particular vehicle for which the given evaluation is performed, and may be obtained in the example method shown in FIG. 2B (process blocks 221, 224, or 225). The vehicle data may include the vehicle make, model, configuration (hatchback, 4-door sedan, etc.) year, color, and trim level. Repair data 1703 is cost data for the various parts of a vehicle as well as data regarding labor costs associated with repairing or replacing such parts. Local database server 105 shown in FIG. 1, for example, or any suitable database accessible to the evaluation engine 101 may be used to store repair data 1703. Damage information 1704 is information regarding the severity of damage of the various damaged parts of the vehicle. This damage information for a given evaluation may be obtained through the process described in FIG. 2E (process block 265). Grid information 1705 comprises information regarding the location of damage on the vehicle. This location information may be obtained according to the process shown in the example method at FIG. 2E (process block 266), and, together with the vehicle data 1702, and the damage information 1704 provides a basic way to query the repair data store to obtain damage estimate data, that is, appropriate repair data 1703 for consideration in performing a given evaluation. The manner in which repair data 1703 is stored in relation to the grid information will be described further below in connection with FIG. 18.

As indicated in FIG. 17, evaluation engine 101 may also apply various rules 1707 in the process of evaluating damages and producing a damage repair estimate. One or more of these rules 1707 may be customized by or for a given client of the evaluation system. The illustrated rules include location rules 1710, vehicle rules 1711, geographical rules 1712, client rules 1714, and damage location rules 1715.

Location rules 1710 are rules that are based on particular sections of a vehicle which may be selected as damaged sections in accordance with the example process shown in FIG. 2C. For example, a section of a given product may require a specific work process based on either the material of the section, the trim of the section, or the integral structure of the product section. Continuing with this example, a section of a given product may have a double skin of material to provide structural integrity or reinforcement, and this double skin structure may require a particular repair process unique to that structure. Such a location rule would require that costs associated with the particular repair process be included in the damage repair estimate produced for an evaluation of damage that includes damage in that particular product section.

Vehicle rules 1711 are rules which are based on the particular type of vehicle for which the evaluation is being performed, and are accessed based on the vehicle data 1702 which is provided for the given evaluation. For example, vehicle rules 1711 may involve particular vehicle idiosyncrasies based on their production year, write-off thresholds, availability of parts, and/or place of manufacture.

Geographical rules 1712 are rules which are based on the location of the vehicle (where the vehicle will likely be repaired). This location may be inferred from the location of the user who requested a given evaluation session or may be obtained as part of the situational information received in accordance with process block 227 of FIG. 2B. Geographical rules 1712 may include shipping costs for parts or tax additions required where a product is to be repaired in a particular zip code or country.

The client rules 1714 are rules which are applicable to a given client of the evaluation system such as for example client insurance company 112 or client company 114 shown in FIG. 1. Client rules may encompass maximum payouts and predefined limits on part replacement costs or sources. For example, a given client (such as an insurance company client) may require Original Equipment Manufacturer (OEM) parts be used rather than used parts for certain part replacement. Client rules may also dictate the options available for presenting the results of the evaluation to the user and/or the options available to the user after the evaluation results are presented to the user.

Damage location rules 1715 are rules based on the location of where the damage occurs in a given selected section, selected in accordance with process block 233 in FIG. 2C for example. In particular, the damage location is indicated by the grid information 1705 provided in a given evaluation session. Damage location rules might consider, for example, the proximity and severity of damage defined close to the edge of a vehicle panel that might require the blending (or color matching), or replacement of adjacent vehicle panels. For example, a damage location rule may require the inclusion of costs associated with color matching where the damage severity information 1704 and grid information 1705 indicate a certain level of damage at a certain grid segment location.

The evaluation engine output can take a number of formats based on client or user needs. These formats may comprise either limited disclosure or full disclosure of part pricing, labor rates, rule considerations and/or vehicle-specific costs or sub-elements of the full evaluation. An example of a limited disclosure output is a "triage format," an output presented as over or under a certain system defined or client defined value. Such a triage output might indicate "over $1,000" without additional detail where the evaluation results in a damage repair estimate total over $1,000, for example. Another type of output for an evaluation might be defined as a "smart repair," where additional detail is given for specific repair components falling within certain predetermined categories, but without providing full evaluation details. This type of evaluation can be used for a client insurance company (for example) to make payout decisions that do not require granular detail be provided to a user.

Figure 18:
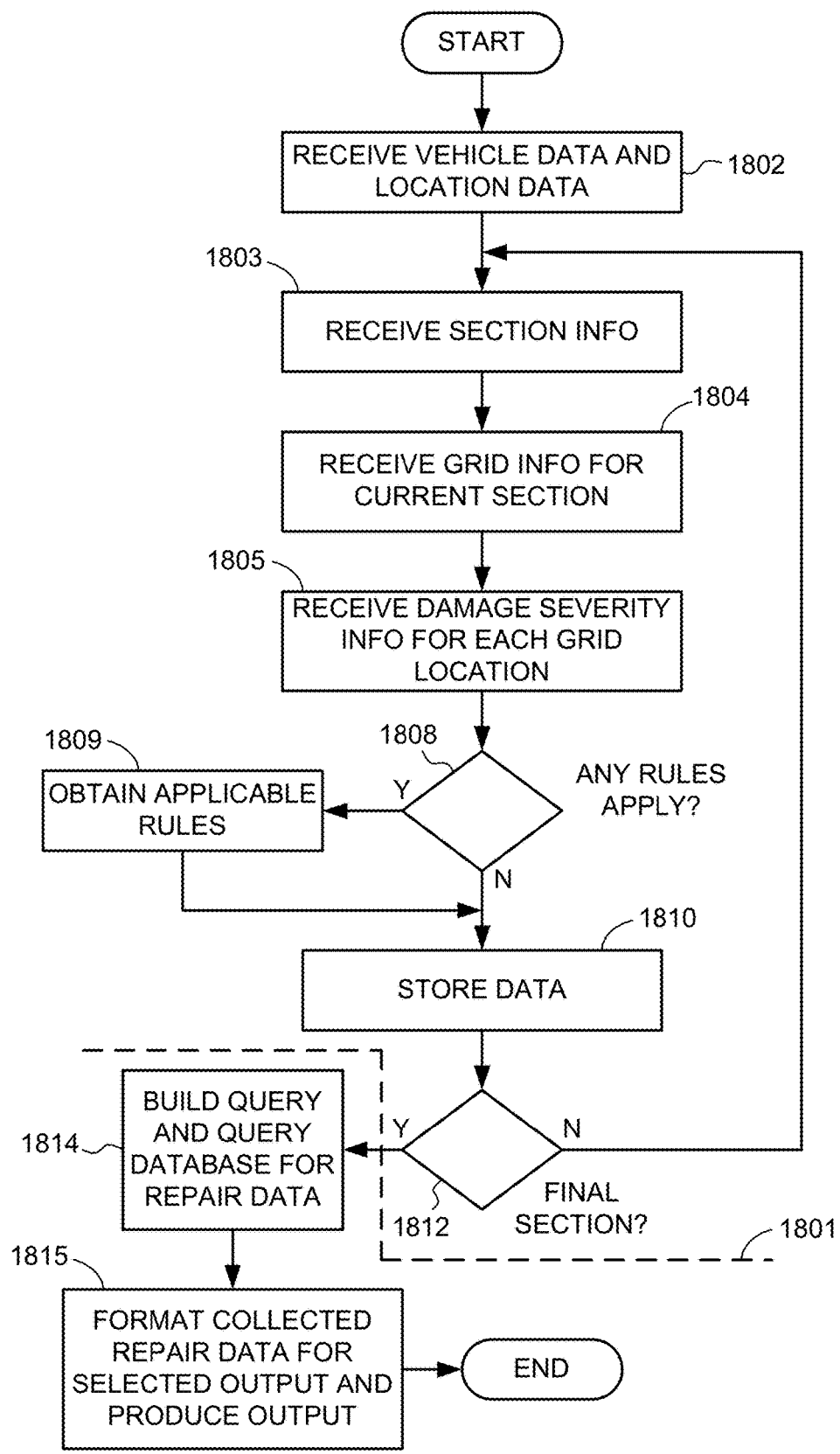
FIG. 18 is a flow chart showing an evaluation process which may be employed by various embodiments of the invention.

FIG. 18 illustrates an example process for performing a damage evaluation according to one preferred implementation of the invention. The process shown in FIG. 18 may be performed by the evaluation engine of the present evaluation system such as evaluation engine 101 in FIG. 1. The illustrated process can be thought of as including two stages. The steps above dashed line 1801 in FIG. 18 are steps associated with collecting information regarding the product for which the evaluation is produced, collecting damage information regarding the product, and collecting other information which may affect the evaluation. The steps below dashed line 1801 in FIG. 18 are the steps associated with performing the evaluation based on the collected information. These steps below dashed line 1801 correspond generally to the evaluation step shown at 280 in FIG. 2F, and comprise using the collected information to retrieve appropriate repair data from one or more databases associated with the evaluation system, and then producing the desired output.

The process shown in FIG. 18 may start with receiving an evaluation session request. This receipt of an evaluation session request may correspond generally to step 201 FIG. 2A. The process next includes receiving vehicle and location data as indicated at process block 1802, receiving section information as indicated at process block 1803, receiving grid information for that section according to the process at process block 1804, and receiving damage severity information for the various grid locations as indicated at process block 1805. The illustrated process then makes a determination as to whether any rules apply to the given evaluation, and if so, as indicated by an affirmative outcome at decision box 1808, obtains the applicable rules as indicated at process block 1809. All the data received through the processes at process blocks 1802 through 1805, and 1809 is stored as indicated at process block 1810, and this data collection process repeats for any additional sections of the product which have been damaged. If no further sections are damaged, the illustrated process branches from decision box 1812, and includes building a query and querying the applicable databases for repair data as indicated at process block 1814. The data returned by this query or set of queries may be formatted as indicated by the applicable rules or otherwise produce the desired output as indicated at process block 1815. The evaluation process then terminates for that evaluation session.

The vehicle data and location data received as indicated at process block 1802 in FIG. 18 may be received in any suitable process, including the process described in FIG. 2B for example. It will be appreciated that location information may be obtained through an input entered by the user, or by reading the location of the user device which the user is using for the evaluation session, or by any other suitable method.

The step of receiving section identifying information at process block 1803 in FIG. 18 may be performed as described above in connection with the steps at the top of FIG. 2C, for example. Regardless of how the section identifying information is received, the process should allow the evaluation engine or an associated component of the present system to cause a graphical representation of the damaged section to be displayed at the user device together with a grid such as that shown in the example of FIG. 12. This representation and grid display allows the user to easily provide information on the location of damage by highlighting a certain area (as discussed above in connection with FIG. 2E and FIG. 12) which is in turn associated with a grid segment. In this way the evaluation engine receives grid information as indicated at process block 1804 in FIG. 18 in a way that allows the evaluation engine to retrieve repair data (1703 in FIG. 17) specifically for that damaged location.

The damage severity information received as indicated at process block 1805 in FIG. 18 may be received from user inputs according to the process described above in connection with process block 265 of FIG. 2E and FIGS. 10 through 14 for example. As with the grid information, the damage severity information allows the evaluation engine to obtain repair data (1703 in FIG. 17) that is specific to the indicated damage, including repair data associated with subparts which are indicated in view of the damage severity. Again, the ability to obtain subpart repair information is facilitated by the grid information which identifies both visible parts and subparts associated with the area of damage.

The determination made at decision box 1808 may be made in a number of different ways depending upon the particular rules which may be applicable. For example, rules may be dictated by a given client of the evaluation system in the case where the client is an insurance company and the user is a customer/insured of the insurance company. In the case of client rules, the client may be identified by the manner in which the evaluation session is started. For example, where a client insurance company webpage takes the user to the evaluation interface webpage, it may also concurrently communicate the client identity to the evaluation system. Alternatively, the user may be queried in some fashion and may directly input the name of an insurance company client or may select an insurance company client from a drop-down menu. Rules regarding the given type of vehicle and a geographic location may be identified from the information received at process block 1802 in FIG. 18. Rules applicable to the given section of the given vehicle may be retrieved from the rule database with information received at process block 1803 in FIG. 18. Rules related to the location of damage on the vehicle may be obtained using information regarding the vehicle, the given section, and the given grid segment received according to process blocks 1802, 1803, and 1804 in addition to damage severity information received according to process block 1805 in FIG. 18.

The step shown at process block 1814 in FIG. 18 will depend significantly upon the characteristics of the database or databases which store the repair data for the evaluation system. Regardless of the particular query language and database characteristics, the query is designed to locate and return repair data based on the input data and rules which have been received according to process blocks 1802 through 1805, and 1809. The invention is not limited to any particular format for storing the repair data or any particular database arrangement or query language.

The output indicated at process block 1815 may be provided in any desirable form and will commonly be dictated by a client (such as a client insurance company for example) according to the rules obtained as indicated at process block 1809. The invention is not limited to any particular type of output or format for the output. However, the output generally will include a damage estimate report such as that shown in FIG. 16, which identifies the labor and parts required for repair, and the costs associated with the labor and parts. Regardless of the particular content and format of the output, the output may be produced in response to a user selection such as a selection indicated at dashed box 285 in FIG. 2F. Alternatively, the evaluation engine may produce a number of different reports and simply select the report to output depending upon a user input or selection. The output may be to a user device, to the relevant client (an insurance company client for example), or both depending upon the client rules and user selections. In any case, a given report output may be associated with a claim identifier in the event the evaluation session is associated with an insurance company client. The insurance company client may then use this claim identifier in the client's internal claim handling system.

It will be appreciated that repair data (1703 in FIG. 17) are stored in a fashion that allows it to be accessed readily with queries depending upon the user inputs which identify the product, the section(s) of the product, and the grid segment(s) of each section which is damaged. That is the section and grid segment data uniquely identify a location of a product, and thus identify the repair data associated with that section of the product. This includes not only the visible parts of the product but also subparts and any repair peculiarities or characteristics associated with the parts and subparts. For example, the repair data for a given part or subpart may be stored in a database entry together with a field identifying a product section in which the part or subpart is included, a field identifying the grid segment of the part or subpart on that product section, and a field identifying the damage level at which the part or subpart is typically damaged and must be repaired or replaced. The grid segment may be defined in terms of a Cartesian coordinate system or any other suitable system which uniquely identifies the various grid segments for the product section. Other database entries, perhaps identified by a part or subpart identifier field which relates the entry to the part or subpart, may store labor costs associated with repairing or replacing the part or subpart.

The repair data stored for various parts and subparts may be associated with attributes which affect the evaluation process. For example, certain black plastic parts or chromed plastic parts are not repairable and must be replaced if they are damaged. Thus these parts each may be associated with an attribute corresponding to the particular characteristic "black plastic" or "chromed plastic". These attributes may be applied in an evaluation when the evaluation engine query returns a part or subpart associated with the given attribute, and a rule may be applied to cause the evaluation engine to identify the part or subpart as a part which must be replaced rather than repaired.

In some implementations of the invention, a standardize grid segment size is used for each grid segment employed in the system. For example, a standard grid segment may be a 6 inch by 6 inch square, or any other suitably sized square or shape. It should be appreciated that there is no limitation as to the size of grid segments which may be employed, although the grid segments should be small enough to allow the evaluation engine to retrieve repair information that accurately describes the repairs actually needed to repair the product. Also, some forms of the present invention may employ a grid system in which the grid segments are not uniformly sized across the given product section. In these cases, the size for a certain grid segment may be selected based on major parts or subparts which may be included in the segment. For example, a grid segment according to the invention may be defined so as to encompass a particular component such as one of the fog lamps of the vehicle shown in the example of FIG. 9. In any event, the grid segments selected by the user (in accordance with block 266 in FIG. 2E for example) are insured to be of the proper size by the process of adjusting the size of the photograph as indicated at the bottom of FIG. 2C and in FIG. 2D.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method including:
   (a) receiving product identifying information at a system of one or more data processing devices included in an evaluation system, the product identifying information identifying a damaged product;
   (b) receiving a section input from a user device, the section input being received at the system of one or more data processing devices included in the evaluation system and identifying a damaged section of the damaged product;
   (c) under control of the system of one or more data processing devices included in the evaluation system, causing an outline for a grid to be displayed at the user device along with a photograph of the identified damaged section as a representation of the identified damaged section and also causing a sizing and alignment interface to be displayed at the user device and prompting the user to use the sizing and alignment interface to size and align the photograph to the outline for the grid, where the outline for the grid is separate from the representation of the identified damaged section and matches a peripheral shape of the representation of the identified damaged section, the grid defining a number of grid segments with each grid segment located over a respective portion of the representation of the identified damaged section once the photograph is sized and aligned with the outline for the grid, the grid and representation of the identified damaged section being displayed together with a number of predefined damage severity indicators, each of the number of predefined damage severity indicators indicating a different level of damage and being associated with a predefined representation of that respective level of damage;

(d) receiving a respective damage severity level input from the user device for each of the grid segments encompassing damage which is to be considered in an overall repair cost estimate for the identified damaged section, each respective damage severity level input being received at the system of one or more data processing devices included in the evaluation system and including a user-selected damage severity indicator selected from the number of predefined damage severity indicators displayed at the user device;

(e) at the system of one or more data processing devices included in the evaluation system, for each respective damage severity level input, retrieving damage estimate data from one or more data storage devices, the retrieved damage estimate data being specified at least in part by (i) that respective grid segment and by (ii) the user-selected damage severity indicator for that respective damage severity level input; and (f) at the system of one or more data processing devices included in the evaluation system, applying the retrieved damage estimate data to produce the overall repair cost estimate for the identified damaged section.

2. An apparatus including:

(a) a first data storage device; and (b) a system of one or more data processing devices operably connected for communication with the first data storage device, the system of one or more data processing devices configured to, (i) receive product identifying information identifying a damaged product;

(ii) receive a section input from a user device, the section input identifying a damaged section of the damaged product;

(iii) cause an outline for a grid to be displayed at a display of the user device along with a photograph of the identified damaged section as a representation of the identified damaged section and also cause a sizing and alignment interface to be displayed at the display of the user device and prompt the user to use the sizing and alignment interface to size and align the photograph with the outline for the grid, where the outline for the grid is separate from the representation of the identified damaged section and matches a peripheral shape of the representation of the identified damaged section, the grid defining a number of grid segments with each grid segment located over a respective portion of the representation of the identified damaged section once the photograph is sized and aligned with the outline for the grid, the grid and representation of the identified damaged section being displayed together with a number of predefined damage severity indicators, each of the number of predefined damage severity indicators indicating a different respective level of damage and being associated with a predefined representation of that respective level of damage;

(iv) receive a respective damage severity level input for each of the grid segments encompassing damage which is to be included in an overall repair cost estimate for the identified damaged section, each respective damage severity level input including a user-selected damage severity indicator selected from the number of predefined damage severity indicators displayed at the display of the user device;

(v) for each respective damage severity level input, retrieve damage estimate data from repair data stored in the first data storage device or in an additional data storage device, the retrieved damage estimate data being specified at least in part by the respective grid segment for which the respective damage severity level input is received and by the user-selected damage severity indicator for that respective damage severity level input; and (vi) apply the retrieved damage estimate data to produce the overall repair cost estimate for the identified damaged section.

3. A program product comprising one or more tangible, non-transitory data storage devices storing program code, the program code including:

(a) grid correlation program code executable to (i) cause a photograph of a damaged section of a product to be displayed at a display of a user device together with an outline for a grid and with a sizing and alignment interface and to prompt the user to use the sizing and alignment interface to size and align the photograph with the outline for the grid, the photograph of the damaged section of the product comprising a representation of the damaged section of the product and the outline for the grid being separate from the representation of the damaged section of the product and the grid defining a number of grid segments with each grid segment located over a respective portion of the representation of the damaged section once the photograph is sized and aligned with the outline for the grid, and to (ii) cause the representation of the damaged section and grid to be displayed at the display of the user device together with a number of predefined damage severity indicators, each of the number of predefined damage severity indicators indicating a different respective level of damage and being associated with a predefined representation of that respective level of damage;

(b) input program code executable to, (i) receive product identifying information identifying the product, and (ii) receive a section input from the user device, the section input identifying the damaged section of the product, and (iii) receive a respective damage severity level input for each of the grid segments encompassing damage which is to be included in an overall repair cost estimate for the identified damaged section, each respective damage severity level input including a user-selected damage severity indicator selected from the number of predefined damage severity indicators displayed at the display of the user device; and (c) evaluation program code executable to, for each respective damage severity level input, retrieve damage estimate data from repair data stored in one or more data storage devices, the retrieved damage estimate data being specified at least in part by the respective grid segment for which the respective damage severity level input is received and by the user-selected damage severity indicator for that respective damage severity level input, the evaluation program code also being executable to apply the retrieved damage estimate data to produce the overall repair cost estimate for the identified damaged section.

* * * * *